(12) United States Patent
Katano

(10) Patent No.: US 8,456,662 B2
(45) Date of Patent: Jun. 4, 2013

(54) CONTROL FOR DISPLAY OF MULTIPLE VERSIONS OF A PRINTABLE DOCUMENT FOR LOCKED PRINT

(75) Inventor: Seiichi Katano, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 779 days.

(21) Appl. No.: 12/423,933

(22) Filed: Apr. 15, 2009

(65) Prior Publication Data

US 2010/0265529 A1    Oct. 21, 2010

(51) Int. Cl.
*G06K 15/00* (2006.01)

(52) U.S. Cl.
USPC .......................... 358/1.14; 358/1.15

(58) Field of Classification Search
USPC .................. 358/1.14, 1.15, 1.18; 709/201
See application file for complete search history.

(56) References Cited

U.S. PATENT DOCUMENTS

| | | | |
|---|---|---|---|
| 5,845,066 A | 12/1998 | Fukuzumi | |
| 5,880,447 A | 3/1999 | Okada et al. | |
| 5,970,218 A | 10/1999 | Mullin et al. | |
| 6,161,139 A | 12/2000 | Win et al. | |
| 6,735,665 B1 | 5/2004 | Kumagai et al. | |
| 6,862,583 B1 | 3/2005 | Mazzagatte et al. | |
| 6,880,124 B1 * | 4/2005 | Moore | 715/210 |
| 6,973,671 B1 | 12/2005 | Hsing et al. | |
| 7,002,703 B2 | 2/2006 | Parry | |
| 7,079,269 B2 | 7/2006 | Teeuwen et al. | |
| 7,170,623 B2 | 1/2007 | Matoba et al. | |
| 7,224,477 B2 | 5/2007 | Gassho et al. | |
| 7,249,900 B1 | 7/2007 | Katano et al. | |
| 7,359,076 B2 | 4/2008 | Uchino | |
| 7,667,865 B2 | 2/2010 | Ciriza et al. | |
| 2001/0029521 A1 * | 10/2001 | Matsuda et al. | 709/201 |
| 2001/0038462 A1 | 11/2001 | Teeuwen et al. | |

(Continued)

FOREIGN PATENT DOCUMENTS

| | | |
|---|---|---|
| EP | 0 657 845 A2 | 11/1994 |
| EP | 1 229 724 A2 | 8/2002 |

(Continued)

OTHER PUBLICATIONS

European Patent Office, "European Search Report", EP application No. EP 07252112, dated Mar. 1, 2010, 6 pages.

(Continued)

*Primary Examiner* — Marivelisse Santiago Cordero
*Assistant Examiner* — Moustapha Diaby
(74) *Attorney, Agent, or Firm* — Hickman Palermo Truong Becker Bingham Wong LLP; Edward A. Becker

(57) ABSTRACT

An approach is provided for implementing locked printing on a printing device with control of the display of multiple versions of locked print data. The printing device includes a locked print process that determines whether the names of two or more locked print jobs stored at the printing device are the same. In response to determining that the respective names of the print jobs are the same, the locked print process causes to be displayed, on the user interface, a group print job name representing the two or more print jobs, instead of causing to be displayed the names of the print jobs individually. Embodiments also include printing the print data of a selected print job when a user requests that the print data associated with the group print job name be printed, and allowing a user to view the print jobs associated with the group print job name.

20 Claims, 16 Drawing Sheets

300

| Security Print | | | | | Exit |
|---|---|---|---|---|---|
| | Print Job Name ▼ | | Date ▽ | Time | |
| Available HDD space: 50MB | × Job Name 1 301 | | 2008/09/01 | 16:58:55 | UserID: USER-ID3 |
| | × Job Name 2 302 | | 2008/09/02 | 16:58:55 | |
| | × Job Name 3 303 | | 2008/08/29 | 16:57:10 | |
| | × Job Name 3 304 | | 2008/09/02 | 16:58:55 | |
| | × Job Name 3 305 | | 2008/09/03 | 16:59:20 | Print |
| Total 7 jobs 1/1 | × Job Name 4 306 | | 2008/09/03 | 17:11:22 | |
| | × Job Name 5 307 | | 2008/09/03 | 17:34:20 | Delete |
| ▲Previous | | | | | Select All |
| ▼Next | | | | | |

U.S. PATENT DOCUMENTS

| | | | |
|---|---|---|---|
| 2002/0023143 | A1 | 2/2002 | Stephenson et al. |
| 2002/0041394 | A1 | 4/2002 | Aoki |
| 2002/0054333 | A1 | 5/2002 | Yamamoto et al. |
| 2003/0044009 | A1 | 3/2003 | Dathathraya |
| 2003/0090696 | A1 | 5/2003 | Willis et al. |
| 2003/0090697 | A1 | 5/2003 | Lester et al. |
| 2004/0019671 | A1 | 1/2004 | Metz |
| 2004/0088378 | A1 | 5/2004 | Moats |
| 2004/0090652 | A1 | 5/2004 | Yoon |
| 2004/0095595 | A1 | 5/2004 | Jacobsen |
| 2004/0118911 | A1 | 6/2004 | Black et al. |
| 2004/0140611 | A1 | 7/2004 | Mui et al. |
| 2004/0156068 | A1 | 8/2004 | Yoshida et al. |
| 2004/0196492 | A1 | 10/2004 | Johnson et al. |
| 2004/0239992 | A1 | 12/2004 | Kawai et al. |
| 2004/0257601 | A1 | 12/2004 | Tomiyasu et al. |
| 2004/0257613 | A1* | 12/2004 | Okabe et al. ............ 358/1.15 |
| 2004/0263870 | A1 | 12/2004 | Itoh et al. |
| 2005/0030580 | A1 | 2/2005 | Moroi |
| 2005/0094195 | A1 | 5/2005 | Sakamoto et al. |
| 2005/0141013 | A1 | 6/2005 | Kikuchi et al. |
| 2005/0154884 | A1 | 7/2005 | Van Den Tillaart |
| 2005/0183141 | A1 | 8/2005 | Sawada |
| 2005/0229189 | A1 | 10/2005 | McManus |
| 2005/0276618 | A1 | 12/2005 | Clement et al. |
| 2006/0279761 | A1 | 12/2006 | Wang et al. |
| 2007/0139695 | A1* | 6/2007 | Young et al. ............ 358/1.15 |
| 2007/0177920 | A1 | 8/2007 | Katano et al. |
| 2007/0247660 | A1 | 10/2007 | Nuggehalli |
| 2007/0273925 | A1 | 11/2007 | Hong |
| 2008/0030772 | A1* | 2/2008 | Shirai ............ 358/1.15 |
| 2008/0114922 | A1 | 5/2008 | Chou et al. |
| 2008/0117452 | A1 | 5/2008 | Murakami |
| 2008/0174810 | A1 | 7/2008 | Kim et al. |
| 2008/0189598 | A1 | 8/2008 | Yoshida |
| 2008/0259380 | A1 | 10/2008 | Nuggehalli |
| 2009/0021778 | A1 | 1/2009 | Wei |
| 2009/0147698 | A1 | 6/2009 | Potvin |
| 2009/0316183 | A1 | 12/2009 | Wei |
| 2010/0002249 | A1 | 1/2010 | Nuggehalli et al. |
| 2010/0253968 | A1 | 10/2010 | Nuggehalli |
| 2011/0013219 | A1 | 1/2011 | Nuggehalli et al. |
| 2012/0140264 | A1 | 6/2012 | Nuggehalli |

FOREIGN PATENT DOCUMENTS

| | | |
|---|---|---|
| EP | 1 465 052 A2 | 10/2004 |
| EP | 1 566 719 A2 | 2/2005 |
| JP | 6152814 A | 5/1994 |
| JP | 2001067201 A | 3/2001 |
| JP | 2002199153 A | 7/2002 |
| JP | 2004181647 A | 7/2004 |
| JP | 2005178070 A | 7/2005 |
| JP | 2005196741 A | 7/2005 |
| JP | 2006231675 A | 9/2006 |
| JP | 2007055022 A | 3/2007 |
| JP | 2008-97115 | 4/2008 |

OTHER PUBLICATIONS

U.S. Appl. No. 11/656,592, filed Feb. 28, 2012, Final Office Action, Feb. 28, 2012.

U.S. Appl. No. 12/144,549, filed Jun. 23, 2008, Notice of Allowance, Mar. 5, 2012.

U.S. Appl. No. 11/880,359, filed Jul. 20, 2007, Office Action, Apr. 4, 2012.

U.S. Appl. No. 13/396,401, filed Feb. 14, 2012, Office Action, May 7, 2012.

U.S. Appl. No. 13/531,249, filed Jun. 22, 2012, Office Action, Aug. 10, 2012.

U.S. Appl. No. 12/417,846, filed Apr. 3, 2009, Final Office Action, Jun. 15, 2012.

European Patent Office, "European Search Report", in application No. 09164263.7, dated May 4, 2012, 6 pages.

U.S. Appl. No. 13/531,249, filed Jun. 22, 2012, Office Action, mailed Aug. 10, 2012.

U.S. Appl. No. 12/417,846, filed Apr. 3, 2009, Final Office Action, mailed Jun. 15, 2012.

U.S. Appl. No. 11/411,248, filed Apr. 25, 2006, Final Office Action, mailed Oct. 27, 2010.

U.S. Appl. No. 11/656,592, filed Jan. 22, 2007, Final Office Action, mailed Nov. 22, 2010.

U.S. Appl. No. 11/788,517, filed Apr. 20, 2007, Office Action, mailed Jan. 10, 2011.

U.S. Appl. No. 11/411,248, filed Apr. 25, 2006, Office Action, mailed Dec. 1, 2009.

U.S. Appl. No. 11/439,796, filed May 23, 2006, Office Action, mailed Jan. 15, 2010.

U.S. Appl. No. 12/417,846, filed Apr. 3, 2009, Office Action, mailed Jun. 7, 2011.

U.S. Appl. No. 11/880,359, filed Jul. 20, 2007, Notice of Publication, mailed Jan. 22, 2009.

U.S. Appl. No. 11/656,592, filed Jan. 22, 2007, Office Action, mailed Jul. 21, 2011.

U.S. Appl. No. 11/880,359, filed Jul. 20, 2007, Restriction Requirement, mailed Jul. 1, 2011.

U.S. Appl. No. 11/788,517, filed Apr. 20, 2007, Notice of Allowance, mailed Jun. 21, 2011.

U.S. Appl. No. 12/166,999, filed Jul. 2, 2008, Office Action, mailed Jun. 6, 2012.

U.S. Appl. No. 11/411,248, filed Apr. 25, 2006, Office Action, mailed May 14, 2010.

U.S. Appl. No. 11/439,796, filed May 23, 2006, Notice of Allowance, mailed Jun. 8, 2010.

U.S. Appl. No. 11/656,592, filed Jan. 22, 2007, Office Action, mailed Jul. 26, 2010.

U.S. Appl. No. 11/880,359, filed Jul. 20, 2007, Office of Action, mailed Aug. 8, 2011.

U.S. Appl. No. 12/417,846, filed Apr. 3, 2009, Interview Summary, mailed Sep. 6, 2012.

U.S. Appl. No. 12/144,549, filed Jun. 23, 2008, Office Action, mailed Nov. 7, 2011.

U.S. Appl. No. 11/788,517, filed Apr. 20, 2007, Notice of Allowance, mailed Oct. 3, 2011.

U.S. Appl. No. 13/531,249, filed Jun. 22, 2012, Final Office Action, mailed Nov. 9, 2012.

U.S. Appl. No. 12/166,999, filed Jul. 2, 2008, Final Office Action, mailed Jan. 3, 2012.

\* cited by examiner

FIG. 3

| | Print Job Name ▶ | Date ▽ | Time |
|---|---|---|---|
| × | Job Name 1  301 | 2008/09/01 | 16:58:55 |
| × | Job Name 2  302 | 2008/09/02 | 16:58:55 |
| × | Job Name 3  303 | 2008/08/29 | 16:57:10 |
| × | Job Name 3  304 | 2008/09/02 | 16:58:55 |
| × | Job Name 3  305 | 2008/09/03 | 16:59:20 |
| × | Job Name 4  306 | 2008/09/03 | 17:11:22 |
| × | Job Name 5  307 | 2008/09/03 | 17:34:20 |

Security Print — Exit

Available HDD space: 50MB

Total 7 jobs
1/1
▲Previous
▼Next

User ID: USER-D3

Print
Delete
Select All

300

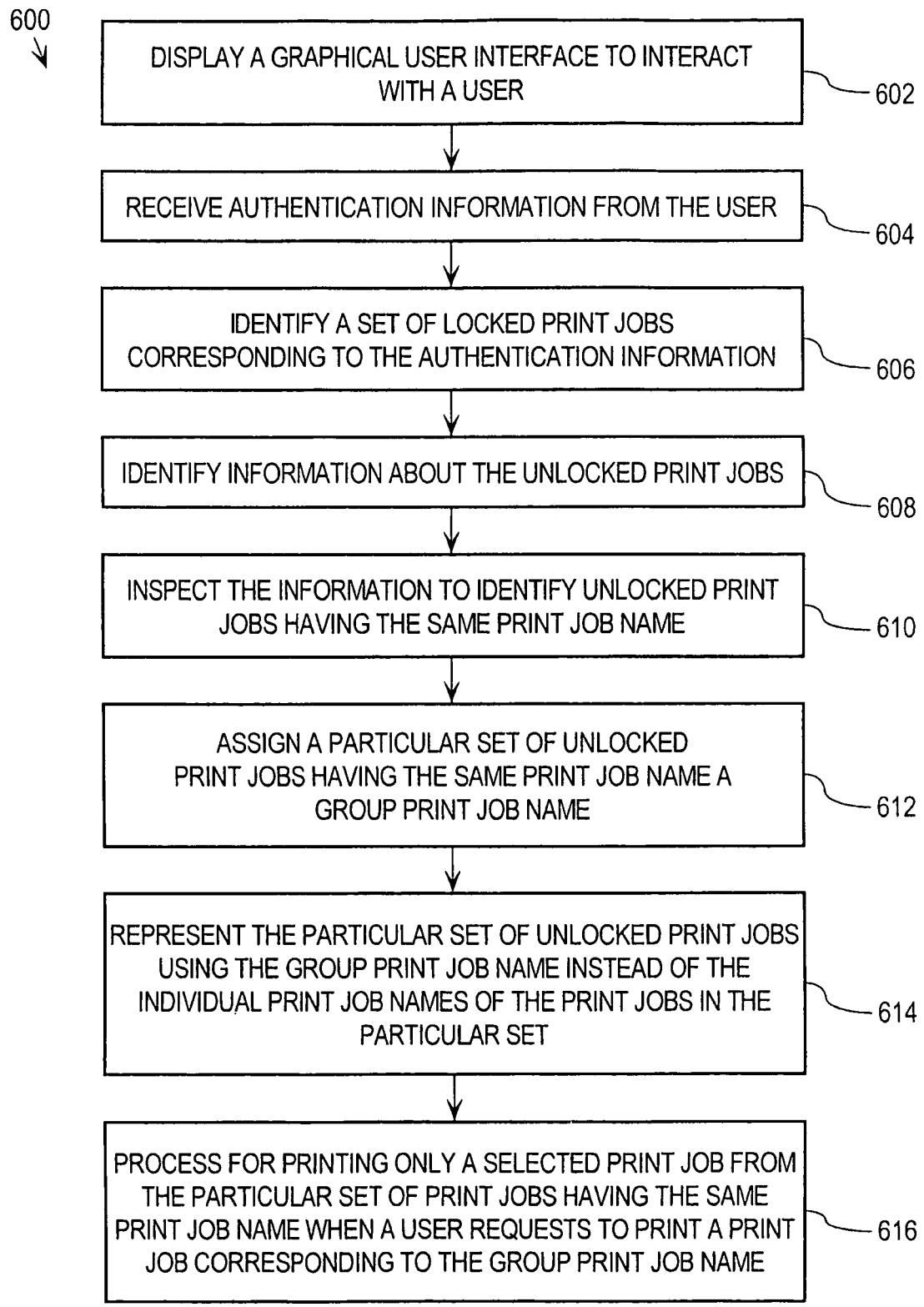

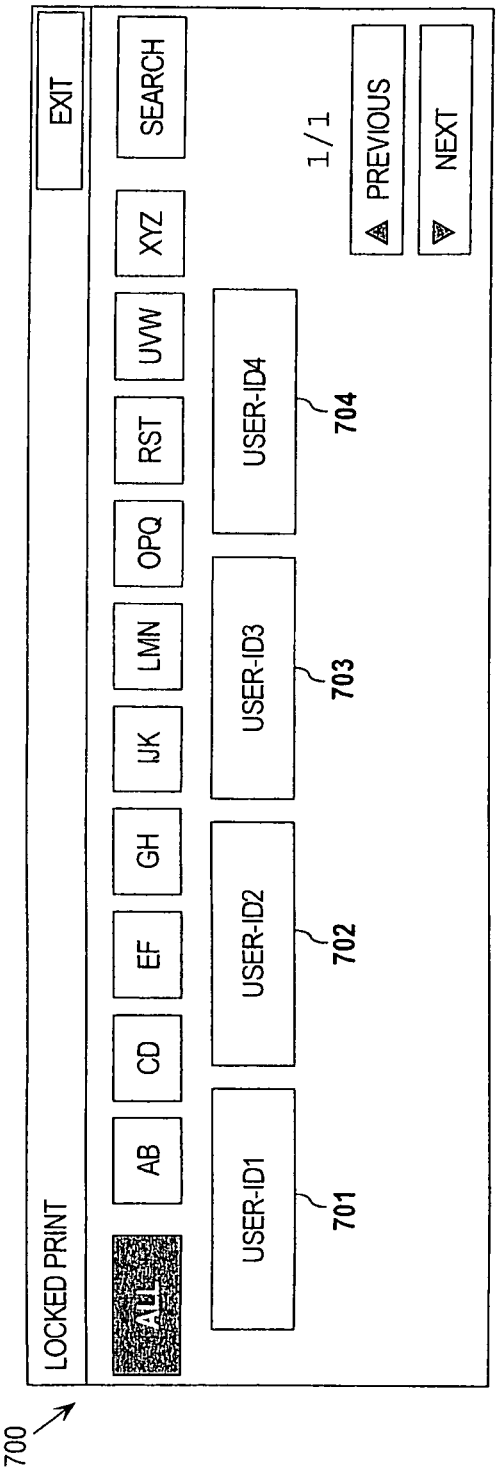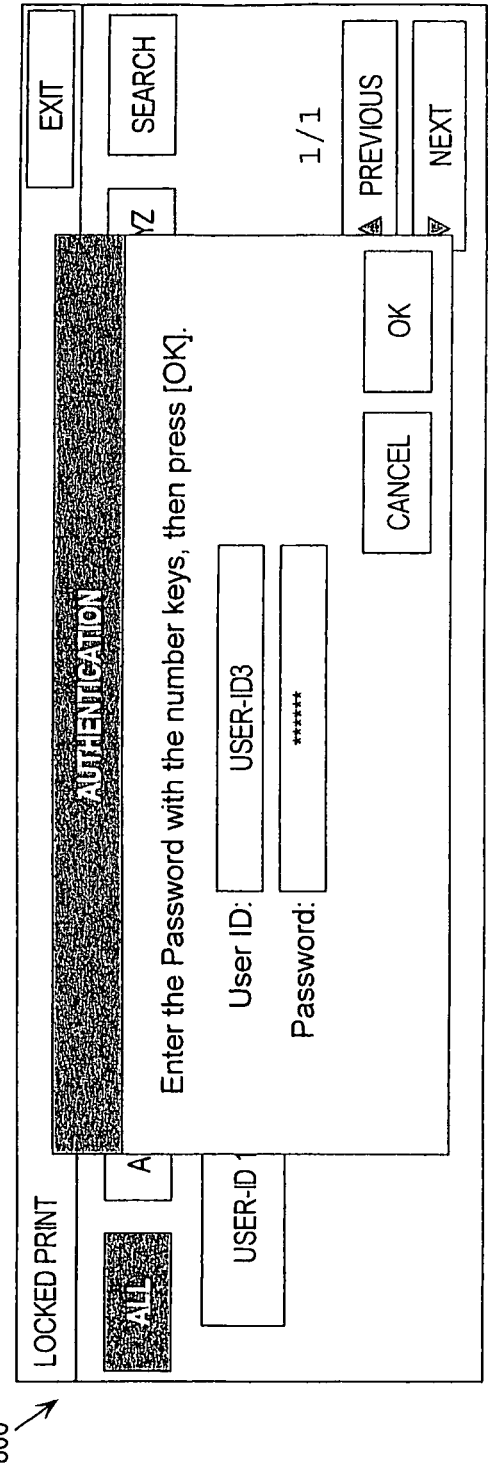

| PRINT JOB NAME 902 | | DATE 904 | TIME 906 | GROUP ID 908 |
|---|---|---|---|---|
| Job Name 1 | 910 | 2008/09/01 | 16:58:55 | |
| Job Name 2 | 911 | 2008/09/02 | 16:58:55 | |
| Job Name 3 | 912 | 2008/08/29 | 16:57:10 | ID1 |
| Job Name 3 | 913 | 2008/09/02 | 16:58:55 | ID1 |
| Job Name 3 | 914 | 2008/09/03 | 16:59:20 | ID1 |
| Job Name 4 | 915 | 2008/09/03 | 17:11:22 | |
| Job Name 5 | 916 | 2008/09/03 | 17:34:20 | |

| GROUP PRINT JOB NAME | GROUP ID |
|---|---|
| Job Name 3* — 1002 | ID1 — 1004 |
| ..... | ..... |

FIG. 11

Security Print

Available HDD space: 50MB

| Document Name ▼ | Date ▽ | Time |
|---|---|---|
| Job Name 1 | 2008/09/01 | 16:58:55 |
| Job Name 2 | 2008/09/02 | 16:58:55 |
| Job Name 3* 1102 | 2008/09/03 | 16:59:20 |
| Job Name 4 | 2008/09/03 | 17:11:22 |
| Job Name 5 | 2008/09/03 | 17:34:20 |

☐ ☐ ☒ ☐ ☐  1104

Total 5 jobs 1/1
▲Previous
▼Next

Exit

User ID: USER-ID3

Print — 1106
Delete — 1108
Select All — 1110

Security Print

Available HDD space: 50MB

Delete Confirmation

You have chosen to delete at least one group print job. Do you wish to continue?

Cancel   OK

Total 5 jobs 1/1
▲Previous
▼Next

Exit

User ID: USER-ID3

Print
Delete
Select All

Security Print — Exit

Available HDD space: 50MB

User ID: USER-ID3

| | Document Name ▼ | Date ▽ | Time |
|---|---|---|---|
| | Job Name 1 | 2008/09/01 | 16:58:55 |
| × | Job Name 2 | 2008/09/02 | 16:58:55 |
| | Job Name 3* ⊞ — 1504 | 2008/09/03 | 16:59:20 |
| | Job Name 4   Job History — 1506 | 2008/09/03 | 17:11:22 |
| | Job Name 5 | 2008/09/03 | 17:34:20 |

1502

Total 5 jobs  1/1

▲ Previous   ▼ Next

Print   Delete   Select All

Security Print — Exit

Available HDD space: 50MB

User ID: USER-ID3

| | Document Name ▼ | Date ▽ | Time |
|---|---|---|---|
| × | Job Name 1 | 2008/09/01 | 16:58:55 |
| × | Job Name 2 | 2008/09/02 | 16:58:55 |
| × | Job Name 3 — 1602 | 2008/08/29 | 16:57:10 |
| × | Job Name 3 ⊟ | 2008/09/02 | 16:58:55 |
| × | Job Name 3   Job History — 1604 | 2008/09/03 | 16:59:20 |
| × | Job Name 4 | 2008/09/03 | 17:11:22 |
| × | Job Name 5 | 2008/09/03 | 17:34:20 |

Total 7 jobs  1/1

▲ Previous   ▼ Next

Print   Delete   Select All

CONTROL FOR DISPLAY OF MULTIPLE VERSIONS OF A PRINTABLE DOCUMENT FOR LOCKED PRINT

RELATED APPLICATION DATA

This application is related to U.S. patent application Ser. No. 12/166,999 entitled LOCKED PRINT WITH INTRUDER DETECTION AND MANAGEMENT, filed Jul. 2, 2008; U.S. patent application Ser. No. 12/144,549 entitled IMPROVE THE PERFORMANCE OF A LOCKED PRINT ARCHITECTURE, filed Jun. 23, 2008; and U.S. patent application Ser. No. 12/417,846 entitled APPROACH FOR DISPLAYING COST DATA FOR LOCKED PRINT DATA AT PRINTING DEVICES, filed Apr. 3, 2009, the contents all of which are incorporated by reference in their entirety for all purposes as if fully set forth herein.

FIELD OF THE INVENTION

This invention relates generally to locked printing on printing devices, and specifically to controlling the display of multiple versions of locked print data on printing devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Some printing devices are configured with a feature known as "locked printing" to provide control over the printing of electronic documents. When the locked printing feature is enabled for print data, also known as a print job, which is sent to such a printing device the printing device stores the print data identified as locked print data, and does not immediately process the print data for printing. The printing device also stores information about the print data, such as a print job name for the print data and authentication information for accessing the print data on the printing device. A user gains access to print jobs stored on a printing device through a user interface on the printing device. The user enters the authentication information, and the printing device grants the user access to the print jobs stored on the printing device that are associated with the entered authentication information.

When a user gains access to locked print data on a printing device, the user interface of the printing device generally displays the print data as a list of print jobs with each print job identified by an associated print job name. However, if the user has sent a particular document as locked print data to the printer multiple times, then the printing device displays multiple print jobs with the same print job name because the print jobs that represent the particular document generally have the same print job name. As such, it is difficult for a user to ascertain which print job of the various displayed print jobs associated with the particular document to process for printing. Furthermore, a multiplicity of print jobs corresponding to a particular document may cause other print jobs to be crowded off a small user interface of a printing device, thus requiring the user to scroll the user interface in order to find print jobs toward the end of the list of displayed print jobs.

SUMMARY

An approach is provided for implementing locked printing on a printing device with control of the display of multiple versions of locked print data. The printing device includes a user interface that is configured to display information to a user and receive user input from the user. The printing device also includes a locked print process that is configured to examine print data received by the printing device and determine whether locked printing is to be used for the print data. Print data designated for locked printing is stored on the printing device. The locked print process is further configured to determine whether the print job name of a first print job stored at the printing device is the same as the print job name of a second print job stored at the printing device. In response to determining that the print job name of the first print job is the same as the print job name of the second print job, the locked print process is configured to cause to be displayed, on the user interface, a group print job name representing the first and second print jobs, instead of causing to be displayed the print job names of the first and second print jobs, respectively.

Embodiments of the invention include visually associating the group print job name with information of a selected print job of the group of print jobs that the group print job name represents, and processing the print data of the selected print job for printing when a user requests that the print data associated with the group print job name be processed for printing. Embodiments of the invention also include the ability to display information for each of the print jobs associated with the group print job name and perform actions on those print jobs individually. In another aspect of the invention, two or more print jobs are compared and the differences between the print jobs are displayed to a user.

In another aspect of the invention, the printing device comprises a user interface configured to display information to a user and receive user input from the user. The printing device also comprises a locked print process configured to determine if a plurality of portions of print data are to be processed as locked print data, wherein a first portion of print data of the plurality of portions of print data is associated with a first print job name, and a second portion of print data of the plurality of portions of print data is associated with a second print job name. In response to determining that the plurality of portions of print data are to be processed as locked print data, the locked print process is configured to cause the plurality of portions of print data to be stored at the printing device and not immediately processed for printing. The locked print process is configured to determine whether the first print job name is the same as the second print job name, and in response to determining that the first print job name is the same as the second print job name, the locked print process is configured to cause to be displayed, on the user interface, a third print job name, representing the first portion of print data and the second portion of print data, instead of causing to be displayed the first print job name and the second print job name.

BRIEF DESCRIPTION OF THE DRAWINGS

In the figures of the accompanying drawings like reference numerals refer to similar elements.

FIG. 3 depicts an example graphical user interface generated at a printing device having multiple print jobs with the same name.

FIG. 6 is a flow diagram depicting an approach for printing locked print data with control of the display of multiple versions of locked print data.

FIGS. 7-8 depict example graphical user interfaces generated at a printing device to allow a user to access print data stored at the printing device.

FIG. 9 illustrates a buffer including information about a set of unlocked print jobs.

FIG. 10 illustrates a mapping of a group ID with a group print job name.

FIGS. 11-12 depict example graphical user interfaces generated at a printing device that control the display of multiple versions of locked print data.

FIGS. 13-20 depict example graphical user interfaces generated at a printing device that facilitate the display of multiple versions of locked print data.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. LOCKED PRINTING ARCHITECTURE
III. LOCKED PRINTING WITH DISPLAY CONTROL
IV. ACCESSING VERSIONS OF LOCKED PRINT DATA
 A. TOGGLE VIEW
 B. JOB HISTORY VIEW
  1. LIST CONTEXT
  2. DATE CONTEXT
  3. CALENDAR CONTEXT
V. COMPARING VERSIONS OF LOCKED PRINT DATA
VI. IMPLEMENTATION MECHANISMS

I. Overview

An approach is provided for implementing locked printing on a printing device with control of the display of multiple versions of locked print data. The printing device includes a user interface that is configured to display information to a user and receive user input from the user. The printing device also includes a locked print process that is configured to examine print data received by the printing device and determine whether locked printing is to be used for the print data. Print data designated for locked printing is stored on the printing device. The locked print process is further configured to determine whether the print job name of a first print job stored at the printing device is the same as the print job name of a second print job stored at the printing device. In response to determining that the print job name of the first print job is the same as the print job name of the second print job, the locked print process is configured to cause to be displayed, on the user interface, a group print job name representing the first and second print jobs, instead of causing to be displayed the print job names of the first and second print jobs, respectively.

Embodiments of the invention include visually associating the group print job name with information of a selected print job of the group of print jobs that the group print job name represents, and processing the print data of the selected print job for printing when a user requests that the print data associated with the group print job name be processed for printing. Embodiments of the invention also include the ability to display information for each of the print jobs associated with the group print job name and perform actions on those print jobs individually. In another aspect of the invention, two or more print jobs are compared and the differences between the print jobs are displayed to a user.

II. Locked Printing Architecture

Figure 1:
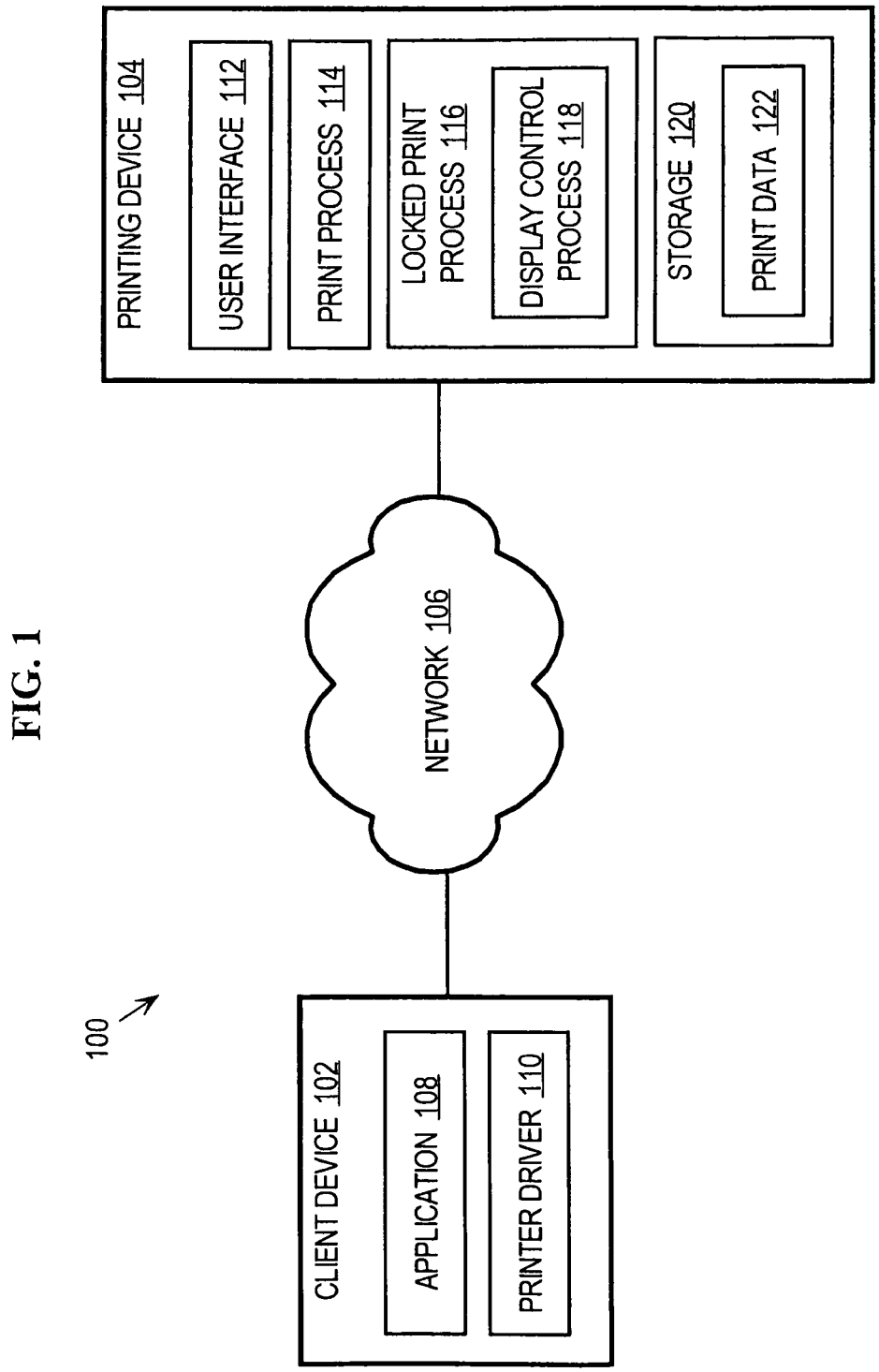
FIG. 1 is a block diagram that depicts a network arrangement for implementing locked printing with control of the display of multiple versions of locked print data on a printing device.

FIG. 1 is a block diagram that depicts an example network arrangement 100 for implementing locked printing on a printing device with control of the display of multiple versions of locked print data, according to an embodiment of the invention. Network arrangement 100 includes a client device 102, and a printing device 104, communicatively coupled via a network 106.

Client device 102 may be implemented by any type of client device. Example implementations of client device 102 include, without limitation, workstations, personal computers, laptop computers, personal digital assistants (PDAs), cellular telephony devices, and any type of mobile devices. In example network arrangement 100 depicted in FIG. 1, client device 102 is configured with an application 108 and a printer driver 110. Application 108 may be any type of application process. Examples of application 108 include, without limitation, a word processor, a spreadsheet program, and an email client. Printer driver 110 is configured to provide a graphical user interface for a user to specify that locked printing is to be used to print particular print data, and to specify that the particular print data is to be sent to a particular printing device, i.e., printing device 104. Printer driver 110 is also configured to process data from application 108 and generate print data that is provided to printing device 104 for processing. Thus, application 108 and printer driver 110 operate together to generate and provide print data to the selected printing device. Client device 102 may be configured with other mechanisms, processes, and functionality, depending upon a particular implementation.

Printing device 104 may be implemented by any type of device that is capable of processing print data received from client device 102 and generate printed versions of electronic documents reflected in the print data. In example network arrangement 100, printing device 104 includes user interface 112, print process 114, locked print process 116, display control process 118, storage 120, and stored print data 122. Printing device 104 may be configured with other mechanisms, processes and functionality, depending upon a particular implementation, and the approach described herein for controlling the display of multiple versions of locked print data on a printing device is not limited to any particular type of printing device or network configuration. For example, printing device 104 may be a multi-function peripheral (MFP) that includes any combination of printing, copying, facsimile and scanning capability, etc. Any number of devices, including printing devices, client devices, and other devices, may be included in the network.

User interface 112 may be any mechanism and/or medium that provides for the exchange of information between a user and printing device 104. Examples of user interface 112 include, without limitation, a control panel with a display and keypad or keyboard, a cathode ray tube (CRT), a liquid crystal display (LCD), a keyboard, touchpad, mouse, trackball, a microphone and speakers, and any combination thereof. Printing device 104 may be configured to display information on user interface 112 in any number of languages, depending upon a particular implementation. As with conventional printing devices, the user interface 112 on printing device 104 may provide the capability to easily enter alphanumeric strings.

Print process 114 may be implemented by one or more processes for processing print data received from client device 102 and for generating a printed version of an electronic document reflected in the print data. Locked print process 116 may be implemented by one or more processes configured to provide locked print services and to verify authentication data, as described in more detail hereinafter. Print process 114 and locked print process 116 may be implemented as resident processes on printing device 104. Alternatively, print process 114 and locked print process 116 may be made available to printing device 104 on a removable media or may be implemented at a remote location with respect to printing device 104.

In example network arrangement 100, locked print process 116 includes display control process 118. Display control process 118 may be implemented by one or more processes resident on printing device 104 that are configured to control the display of multiple versions of locked print data on printing device 104. Alternatively, display control process 118 may be implemented independently from locked print process 116, or may be made available to printing device 104 on a removable media or may be implemented at a remote location with respect to printing device 104.

Storage 120 may be implemented by any type of storage, including volatile and non-volatile storage. Examples of storage 120 include, without limitation, random access memory (RAM) and one or more disks. In example network arrangement 100, storage 120 includes stored print data 122, which may include one or more print jobs stored at printing device 104.

User interface 112, print process 114, locked print process 116, display control process 118, and storage 120 may be implemented in hardware, software, or any combination of hardware or software, depending upon a particular implementation.

Network 106 may be implemented with any type of medium and/or mechanism that facilitates the wireless exchange of information between client device 102 and printing device 104. Furthermore, network 106 may use any type of communications protocol and may be secured or unsecured, depending upon the requirements of a particular application.

III. Locked Printing with Display Control

Figure 2:
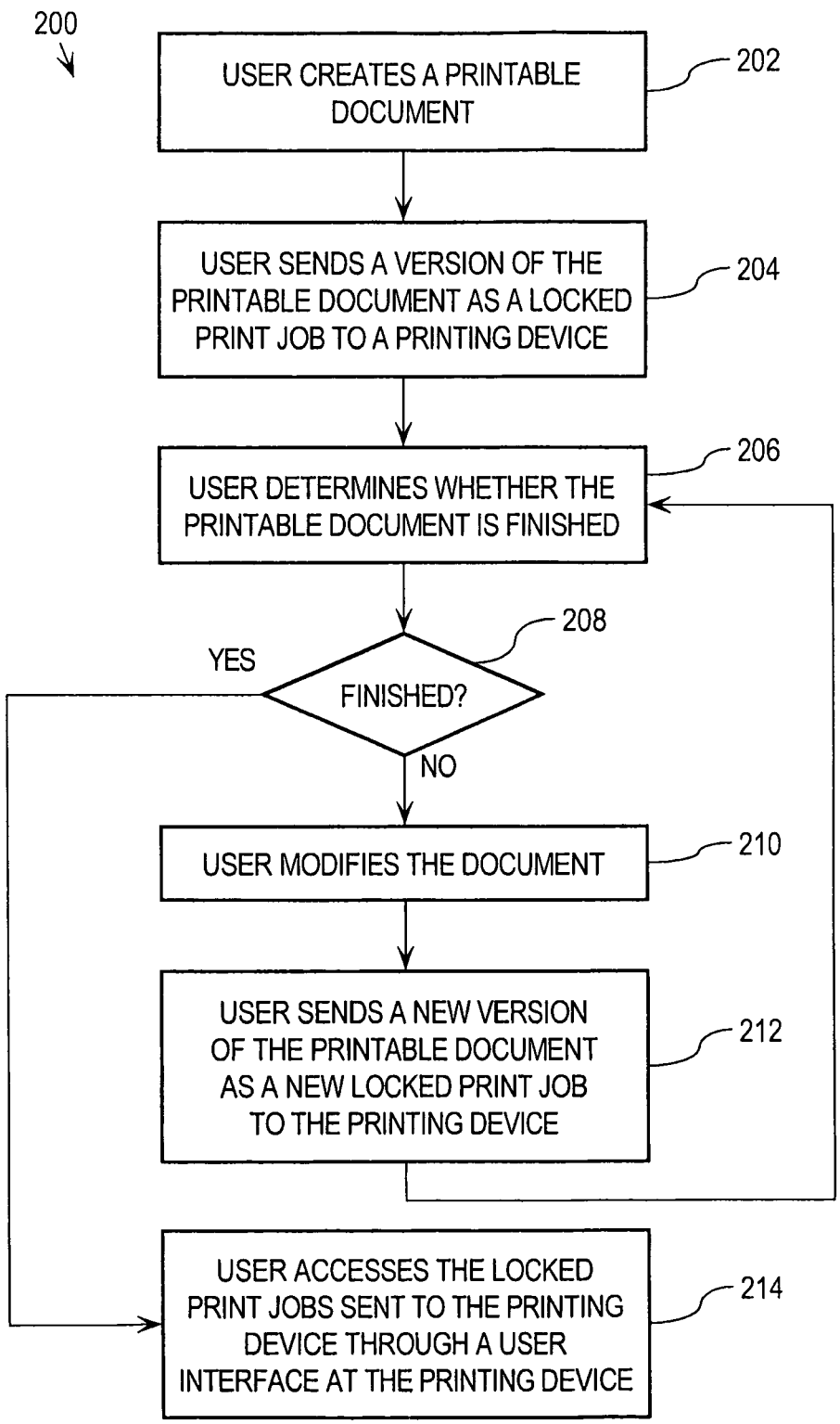
FIG. 2 is a flow diagram depicting an example of a user creating multiple versions of a particular printable document.

The approaches described here for implementing locked printing on a printing device with control of the display of multiple versions of locked print data on a printing device allows a user to more easily view and print a desired version of locked print data stored at the printing device. FIG. 2 illustrates an example process 200 of a user sending multiple versions of locked print data to a printing device. At step 202, a user creates a printable document. For example, in network arrangement 100 of FIG. 1, a user at client device 102 uses application 108 to create a printable document. At step 204, the user sends a version of the printable document as a locked print job to a particular printing device. For example, the user sends the print data corresponding to the printable document created at application 108 as a locked print job to printing device 104, by means of printer driver 110 and over network 106.

At step 206, the user determines whether the printable document is finished by reviewing the document. At step 208, if the document is determined to be unfinished, then, at step 210, the user modifies the printable document. At step 212, the user sends a new version of the printable document as a new locked print job to the particular printing device. To illustrate in the context of the aforementioned example, the user reviews the printable document through application 108 and determines that the printable document is unfinished. The user then modifies the printable document through application 108 and sends a new version of the printable document to printing device 104 as a new locked print job. Steps 206-212 may be repeated by the user until the user is satisfied that the document is finished at steps 206 and 208.

Because the print jobs that the user sent to the particular printing device are designated as locked print data, the particular printing device stores the print jobs instead of immediately processing the print jobs for printing. Thus, at step 214, the user accesses the stored print jobs that the user sent to the particular printing device through a user interface at the particular printing device, once the user is satisfied that the printable document is finished. Generally, a printing device represents a particular print job stored at the printing device using the name of the document represented in the print data of the print job. Therefore, because the user sent various versions of the same printable document to the particular printer, each of the print jobs corresponding to the printable document are represented at the particular printing device with the same print job name. Graphical user interface 300 of FIG. 3 illustrates an example of a graphical user interface showing multiple locked print jobs 303-305 having the same print job name, "Job Name 3". The print job name of a print job may also be called a "document name", or a "job name", etc.

Print jobs having the same print job name are generally versions of the same print data, which were sent to the particular printing device as locked print data at different times. Many times a user wishes to print a particular print job of a group of print jobs having the same name based on the date and time, or time stamp, of the particular print job. For example, a user may wish to process for printing the most recent print job of the group of print jobs, or a print job having a particular time stamp. However, in the example of graphical user interface 300, locked print jobs 303-305 have visually similar dates and times, and it may be difficult for a user to determine which print job is the appropriate print job to print. Furthermore, if the user has printed a particular document many times, e.g., 15 or more times, the user may have to scroll through pages of print jobs to determine which print job to print. Also, if the user has printed several different documents intermittently over a period of time, then sorting, by date, the print jobs stored at a particular printing device could result in a seemingly random ordering of document names, making the task of determining which print job to print even more difficult.

Figure 4:
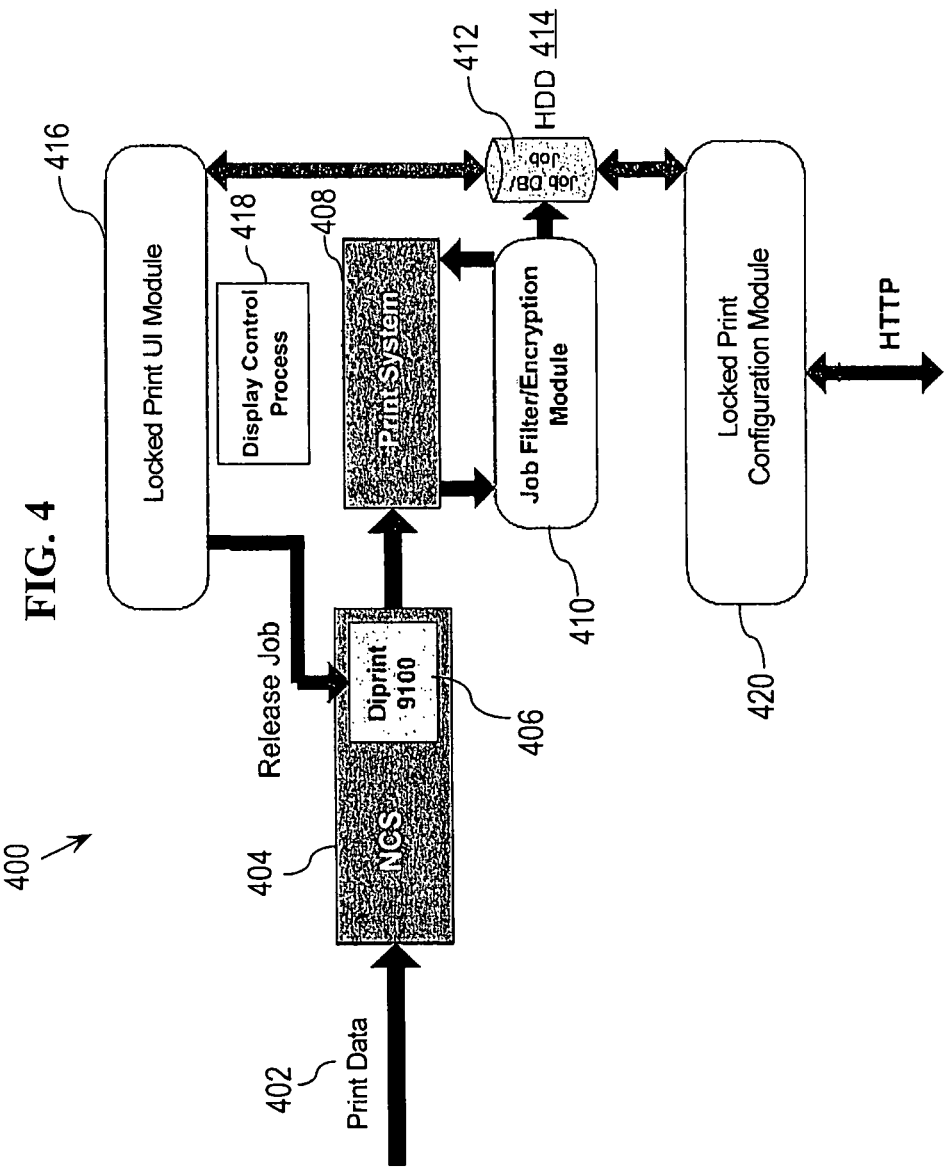
FIG. 4 is a block diagram that depicts an example arrangement of a printing device for implementing locked printing with control of the display of multiple versions of locked print data.

FIG. 4 is a block diagram that depicts an example arrangement of a printing device 400 for implementing locked printing with control of the display of multiple versions of locked print data, according to an embodiment of the invention.

While the embodiments of the invention are described in the context of printing device 400, etc., the embodiments of the invention are not restricted to any particular configuration of printing device.

When a client sends print data 402 to printing device 400, printing device 400 receives the print data through Network Control Service (NCS) 404. NCS 404 runs one or more services to accept print data 402, e.g., Diprint process 406, which is a socket listening on port 9100. NCS 404 optionally runs other services to accept print data 402, e.g., File Transfer Protocol (FTP), Line Printer Remote protocol (LPR), and direct connections to the printing device such as parallel ports and Universal Serial Bus (USB) ports, etc.

NCS 404 transfers print data 402 to Print System 408, which runs a Page Description Language (PDL) Interpreter to interpret PDL data embedded in print data 402. This interpreter processes languages such as Printer Job Language (PJL), PostScript (PS), Printer Control Language (PCL) 5 and 6, and Refined Printing Command Stream (RPCS), etc. Print System 408 transfers print data 402 to Job Filter Module 410, which identifies whether the print data is locked print data or normal print data. Print data may be identified as locked print data, for example, by containing a locked print command. In this embodiment of the invention, if print data 402 is normal print data, then Job Filter Module 410 returns print data 402 to Print System 408, which immediately processes print data 402 for printing on printing device 400. However, if print data 402 is locked print data, print data 402 is marked as normal print data, and stored on hard disk drive (HDD) 414 at Job Database (DB) 412. Print data 402 is stored at HDD 414 as normal print data to facilitate printing the stored print data upon request from a user. Alternatively, print data 402 may be stored as locked print data at HDD 414, and the designation of locked print data may be removed upon a request to process print data 402 for printing.

Figure 5:
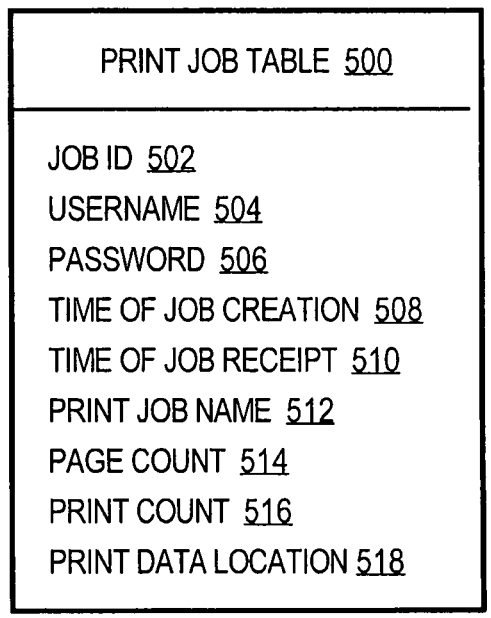
FIG. 5 illustrates a database schema for a print job table.

Information about print data stored on HDD 414 is stored at Job DB 412. FIG. 5 is an example database schema for a print job table 500 stored at Job DB 412. As indicated by the schema for print job table 500, Job DB 412 may record, for each print job stored at printing device 400, a Job ID 502, a Username 504, a Password 506, a time stamp reflecting the Time of Job Creation 508, which is a record of the date and time that the print job was created by a client device, a time stamp reflecting the Time of Job Receipt 510, which is a record of the date and time that the print job was received at the printing device, a Print Job Name 512, a Page Count 514, a Print Count 516, which indicates how many times the print job has been processed for printing since the print job was stored on HDD 414, and a Print Data Location 518 indexing the location of the print data for the print job on HDD 414, etc. A print job name may be assigned to a particular print job by the printer driver that forwarded the print data for the particular print job to the particular printing device. A print job name may also be assigned to a particular print job by the particular printing device, e.g., based on a document name of the print data for the particular print job. The schema for print job table 500 is simplified in FIG. 5 for purposes of explanation, and Job DB 412 may include features and attributes not shown in the schema for print job table 500, or may exclude one or more features shown in the schema for print job table 500.

Once locked print data is stored on HDD 414, a user may access this print data through Locked Print User Interface (UI) Module 416. Flow diagram 600 of FIG. 6 illustrates an example process of accessing locked print data at a particular printing device with control of the display of versions of the locked print data, according to one embodiment of the invention. At step 602, the particular printing device displays a graphical user interface to interact with the user. For example, Locked Print UI Module 416 of printing device 400 displays a graphical user interface such as graphical user interface 700 of FIG. 7, which is populated with data from Job DB 412.

At step 604, the particular printing device receives authentication information, such as a username and password, from the user through the displayed graphical user interface. In the example of graphical user interface 700, the user may select one of the series of buttons 701-704, each of which displays a username found in Job DB 412. Selection of one of buttons 701-704, e.g., button 703 signifying "USER-ID3" as the username, submits the corresponding username to Locked Print UI Module 416. Locked Print UI Module 416 then displays a graphical user interface such as graphical user interface 800 of FIG. 8 to request a password from the user. In the alternative, Locked Print UI Module 416 may display a graphical user interface that requests that the user type in both a username and a password. Allowing a user to access locked print data using authentication information may be implemented in various ways within the embodiments of this invention.

At step 606, the particular printing device identifies a set of locked print jobs corresponding to the authentication information submitted by the user. For example, when a user inputs authentication information to Locked Print UI Module 416, Locked Print UI Module 416 queries Job DB 412 to identify a set of print jobs stored on HDD 414 that are associated with the submitted authentication information. In one embodiment of the invention, Job DB 412 is a Structured Query Language (SQL) database that contains a print job table that conforms to the schema of print job table 500 of FIG. 5. In this embodiment, Locked Print UI Module 416 may identify the set of locked print jobs corresponding to a particular username and password by performing an SQL database query to select the set of print jobs from the print job table in Job DB 412 that contain the particular username and password combination provided by the user. Such a database query would result in the set of print jobs in the print job table that correspond to the user's username and password, which are then considered "unlocked."

At step 608, the particular printing device identifies information about the set of unlocked print jobs. For example, Locked Print UI Module 416 reads the information identified through the SQL query on the print job table of Job DB 412 into a buffer, such as example buffer 900 of FIG. 9. This information may include all information stored at the print job table of Job DB 412, or a subset thereof. In the example of buffer 900, Locked Print UI Module 416 identifies the print job name 902 of each unlocked print job, a date 904 for each unlocked print job, and a time 906 for each unlocked print job. Buffer 900 also includes a Group ID 908 for print jobs 912-914, which is explained in more detail below. The date and time identified by Locked Print UI Module 416 may reflect a time stamp for job receipt, or a time stamp for job creation, or any other time stamp associated with a print job. Other information not identified in the schema of print job table 500 may also be identified by Locked Print UI Module 416 in connection with unlocked print data. The specific information identified by Locked Print UI Module 416 about the set of unlocked print jobs is configurable through Locked Print Configuration Module 420.

An administrator may make changes to the configuration of printing device 400, and to the functionality of Locked Print UI Module 416, through Locked Print Configuration Module 420. In one embodiment of the invention, the changes made by the administrator through Locked Print Configuration Module 420 apply to all users of printing device 400. Locked Print Configuration Module 420 may include a Web-based user interface provided to allow a user, such as an administrator, to specify configuration data that at least defines one or more functions performed by Locked Print UI Module 416. In the alternative, the configuration of a particular printing device may be specified in other ways. For example, a user may specify the configuration of locked print parameters of a particular printing device by editing a configuration text file and saving the configuration text file to the particular printing device.

At step 610, the information about the unlocked print jobs is inspected to identify unlocked print jobs having the same print job name. As indicated previously, print jobs having the same print job name are versions of the same print data, which were sent to the particular printing device as locked print data at different times. To illustrate, Locked Print UI Module 416 inspects the print jobs in buffer 900 and determines that print jobs 912-914 have the same print job name. Locked Print UI Module 416 indicates that print jobs 912-914 are a group of print jobs 918 having the same print job name by assigning print jobs 912-914 the same Group ID 908, "ID1". Locked Print UI Module 416 may assign a different group of print jobs that share a common print job name a different unique Group ID 908, such as "ID2". Furthermore, other methods of grouping a set of print jobs having the same print job name may be implemented within the embodiments of the invention.

Through Locked Print Configuration Module 420, an administrator may specify that the number of print jobs in a group having the same print job name must exceed a specified threshold before the group is assigned a group id. For example, an administrator may specify, through Locked Print Configuration Module 420, that the threshold number of print jobs for grouping is three. As such, if more than three print jobs are found to have the same print job name, then these print jobs are assigned a group id, but if three or less print jobs are found to have the same print job name, then these print jobs are not assigned a group id, and are displayed separately, as further described below.

At step 612, a set of print jobs identified as having the same print job name are assigned a group print job name. For example, table 1000 of FIG. 10 illustrates a mapping of group ID 1004, "ID1", with a group print job name 1002, "Job Name 3*". As such, group print job name 1002 includes the name of each of print jobs 912-914, "Job Name 3", with an additional character at the end, "*", to visually indicate that the print job name is a group print job name. The use of an asterisk in a group print job name is one example of visually distinguishing a group print job name, and a wide variety of approaches may be used, depending upon a particular implementation. Other examples include, without limitation, "Job Name 3 (group)", "Group Job", or the exact name of the print jobs that the group print job name represents, i.e., "Job Name 3".

The format of the group print job name selected by Locked Print UI Module 416 to represent a particular set of print jobs having the same print job name is configurable through Locked Print Configuration Module 420. As such, an administrator may specify, through Locked Print Configuration Module 420, that a group print job name selected by Locked Print UI Module 416 should be the exact name of the print jobs themselves, or the name of the print jobs plus an additional phrase, character, or symbol to allow the user to easily identify group print job names, etc. As another alternative, the appearance of a print job name may be selected to indicate that the print job name is a group print job name. For example, a print job name may be bolded, highlighted, underlined, or displayed in a different font or color to indicate that the print job name is a group print job name. As another example, a print job name may be surrounded by a rectangle or other user interface element to indicate that the print job name is a group print job name. Furthermore, if the appearance of a print job name is used to indicate that the print job name is a group print job name, i.e., using bold text, font color, etc., then the group print job name may be the same as the print job names of the group, or the group print job name may be different than the print job names of the group.

At step 614, the set of print jobs having the same print job name are represented, on a graphical user interface, using the group print job name assigned to the set instead of the print job names of the print jobs in the set. For example, Locked Print UI Module 416 displays, on graphical user interface 1100 of FIG. 11, the print jobs 910-911 and 915-916 associated with a user's username and password as listed in buffer 900. However, print jobs 912-914 are represented by the assigned group print job name 1102, and are not displayed individually.

At step 616, only a selected print job from the set of print jobs having the same print job name is processed for printing when a user requests to print a print job corresponding to the group print job name. The selected print job for such a set of print jobs may be termed the "active" print job for purposes of explanation. When the group print job name of a group is displayed, the group print job name may be visually associated with information for the active print job of the group to indicate to the user which print job is the active print job for the group. As such, a group print job name may be visually associated with a time stamp of the active print job of the group, etc. For example, Locked Print UI Module 416 may select the print job having the most recent time stamp for job creation or the most recent time stamp for job receipt to be the active print job for the group of print jobs 918, which is print job 914. Thus, if a user requests to print the print job associated with group print job name 1102 of graphical user interface 1100, then printing device 400 processes print job 914 for printing. Furthermore, group print job name 1102 is visually associated with the date and time information for the active print job of the group of print jobs 918, which is print job 914. This visual association may indicate to the user that print job 914 is the active print job for the group of print jobs associated with group print job name 1102. Other criteria may be used to determine the active print job for a group, such as size of the print job, etc. The criteria used to determine the active print job for a group may be configurable through Locked Print Configuration Module 420.

To process print job 914 for printing, Locked Print UI Module 416 makes a local socket connection to Diprint process 406, and writes the print data associated with print job 914 to the socket connection. NCS 404 receives the print data through Diprint process 406 and sends the selected print data to Print System 408, which sends the selected print data to Job Filter Module 410. Because all locked print data stored on HDD 414 is marked as normal print data upon storage, Job Filter Module 410 detects that the selected print data is normal print data and sends the selected print data back to the Print System 408 to be immediately processed for printing.

The user may also delete print jobs from the hard disk drive of a particular printing device. For example, if a user requests that the print job corresponding to group print job name 1102 be deleted, then Locked Print UI Module 416 may interpret the request as a request to delete all of the print jobs associated with group print job name 1102. As such, Locked Print UI Module 416 may display a warning to the user that the user has chosen to delete a group of print jobs, as illustrated by graphical user interface 1200 of FIG. 12. In this example, if the user continues with the deletion, each of print jobs 912-914, associated with group print job name 1102, is removed from HDD 414 and Job DB 412.

IV. Accessing Versions of Locked Print Data

Through controlling the display of multiple versions of locked print data, Locked Print UI Module 416 facilitates quickly viewing and printing a selected version of a particular printable document. Nevertheless, it is advantageous to provide a user with access to all unlocked versions of a particular printable document. An embodiment of the invention provides a user with access to all unlocked versions of a particular printable document in at least two ways, both of which are described in further detail below: through a toggle view, which displays all versions of a particular printable document in line with all other unlocked print jobs; and through a job history view, which displays all versions of a particular printable document in a visually distinct graphical user interface element, such as a window. These views may be implemented separately, or may be provided to the user in combination, the implementation of which is configurable through Locked Print Configuration Module 420. Also, the individual configurations of the toggle view and the job history view are selectable through Locked Print Configuration Module 420.

A. Toggle View

Figures 13, 14:
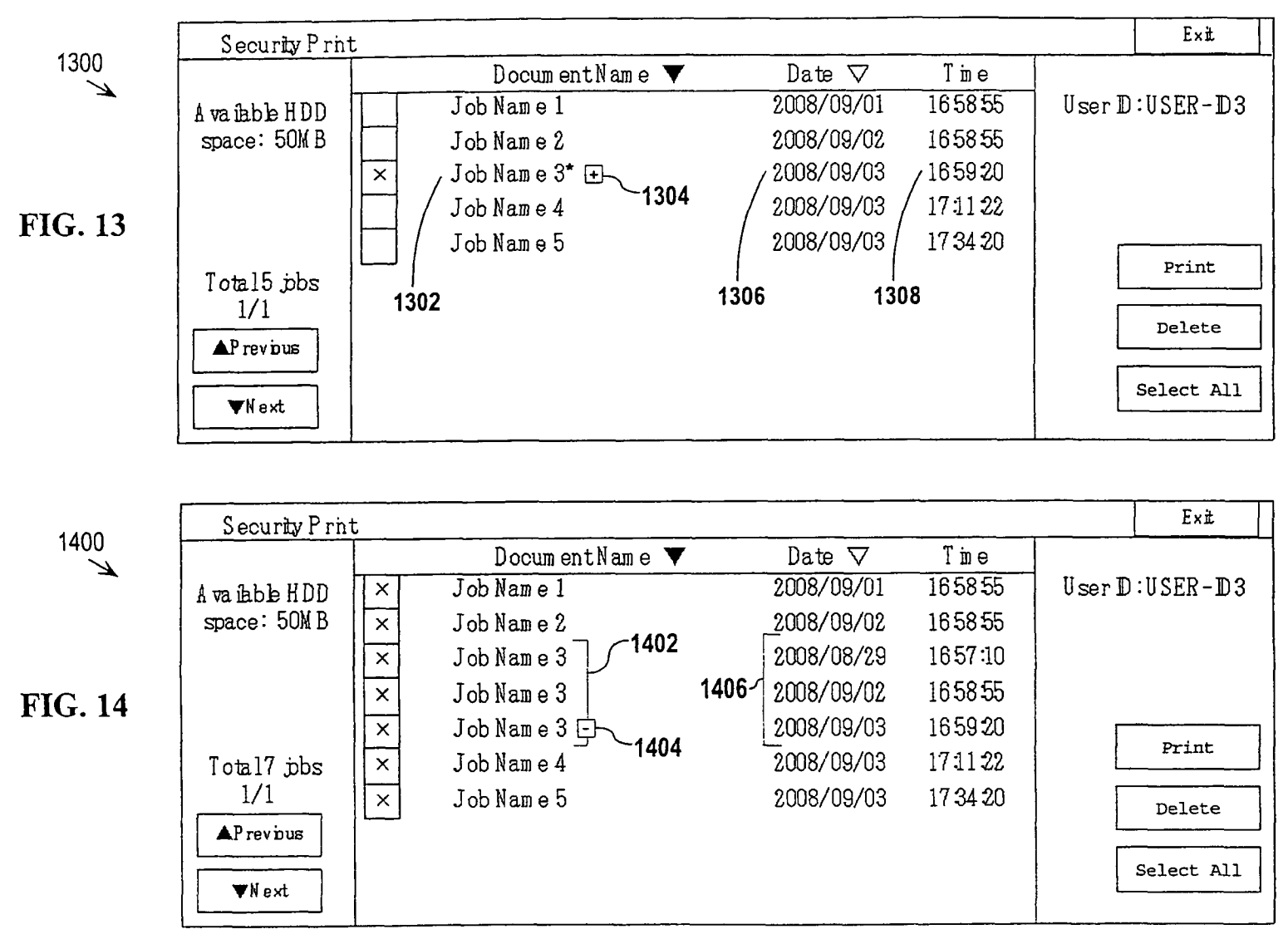

The toggle view capability allows a user to view information about the print jobs associated with a group of print jobs having the same name. This toggle view presents the information about the group of print jobs in line with the other unlocked print jobs displayed to the user. For example, graphical user interface 1300 of FIG. 13 illustrates a group print job name 1302, "Job Name 3*", that is visually associated with graphical user interface (GUI) element, i.e., Expand button 1304. When selected, Expand button 1304 causes group print job name 1302, and the information associated therewith, i.e., date 1306 and time 1308, to be replaced with the individual print job names and information for each print job associated with the group of print jobs that group print job name 1302 represents. For example, graphical user interface 1400 of FIG. 14 does not display a group print job name, but displays the print job names 1402 and information 1406 of each of the print jobs associated with the group of print jobs having the same name, i.e., the group of print jobs is expanded. Each print job of the group is individually selectable, and may be printed or deleted, etc., individually. While the example of graphical user interface 1400 does not display the group print job name associated with print job names 1402, the group print job name may remain visible on a graphical user interface showing an expanded group of print jobs within the embodiments of the invention.

Graphical user interface 1400 further includes a GUI element that is visually associated with print job names 1402, i.e., Contract button 1404. When selected, Contract button 1404 replaces the individual print job names 1402 and information 1406 with the applicable group print job name and information, i.e., the group of print jobs is contracted. For example, selecting Contract button 1404 may return the user to graphical user interface 1300 of FIG. 13.

If the set of unlocked print jobs includes multiple groups of print jobs that are represented by group print job names, then each group print job name has a visually associated GUI element analogous to Expand button 1304, which functions similarly.

As previously indicated, the configuration of the toggle view may be adjusted through Locked Print Configuration Module 420. For example, an administrator may specify, through Locked Print Configuration Module 420, that any number of the print jobs may be automatically depicted as selected when a particular group of print jobs having the same name is expanded, e.g., through selection of Expand button 1304 of FIG. 13. For example, all of the print jobs may be depicted as selected, only the active print job of the particular group of print jobs may be depicted as selected, etc. Also, an administrator may specify that a particular visual representation is to be used for a GUI element that implements the toggle view, such as Expand button 1304 or Contract button 1404. For example, an administrator may specify, through Locked Print Configuration Module 420, that a GUI element performing the functions described in connection with Expand button 1304 is a GUI button including the label "Expand".

B. Job History View

A job history view capability may also be provided to allow a user to view print job information associated with a group of print jobs having the same name. The job history view presents information about the group of print jobs in a visually distinct graphical user interface element, i.e., a window. This job history view may include various contexts, which allow the user to easily sort through a group of print jobs having the same print job name. Each context included in the job history view should highlight differences between the print jobs, especially with respect to a particular characteristic, i.e., the time stamp of the individual print jobs of the group. For purposes of explanation, the time stamp of a print job represents the time of creation, but the time stamp of a print job may be any time stamp related to the print job. An administrator may select which time stamp is the time stamp through Locked Print Configuration Module 420. The job history view may also highlight other characteristics of the print jobs, e.g., size of the respective print jobs, the first few lines of the respective print jobs, etc.

The job history view capability may be represented by a GUI element such as Job History button 1506 displayed on graphical user interface 1500 of FIG. 15. Job History button 1506 is visually associated with both group print job name 1502 and Expand button 1504, which represents the toggle view capability as described above. While graphical user interface includes both Expand button 1504 and Job History button 1506, Locked Print UI Module 416 may include only one of Expand button 1504 and Job History button 1506 in such a graphical user interface, depending upon a particular implementation. Graphical user interface 1600 of FIG. 16 further illustrates the visual association of GUI element 1604, representing a job history view, with an expanded view of the group of print jobs 1602 having the same name.

Figure 17:
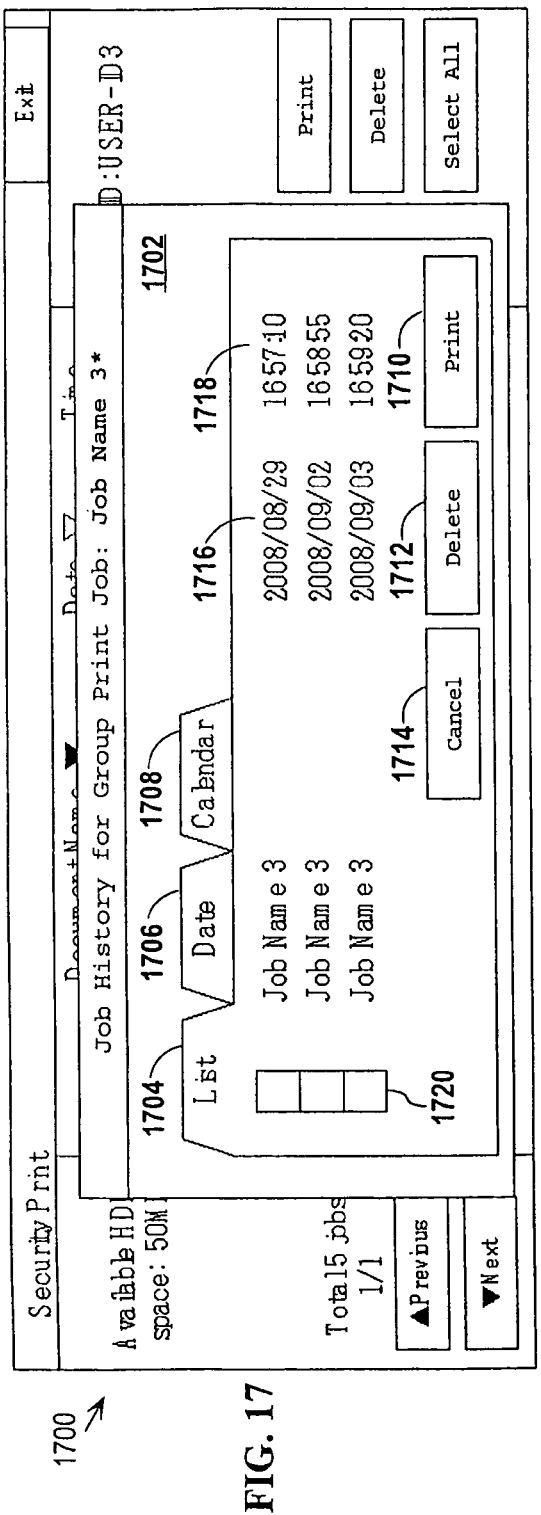

When a GUI element representing the job history view is selected, a visually distinct GUI element, such as a job history window 1702 of graphical user interface 1700 of FIG. 17, is displayed to the user. In the example of graphical user interface 1700, job history window 1702 includes a List context 1704, a Date context 1706, and a Calendar context 1708. Each of these contexts provides a distinct view of the print jobs in a group of print jobs corresponding to a particular group print job name, i.e., "Job Name 3*". Any combination of contexts that provide distinct views of print jobs having the same name may be implemented within the embodiments of the invention. Job history window 1702 also includes actions that the user may perform on one or more of the print jobs included in the job history window. For example, job history window 1702 includes the ability to print one or more of the print jobs displayed, e.g., by selecting print button 1710, to delete one or more of the print jobs displayed, e.g., by selecting delete button 1712, or to remove job history window 1702 from view, e.g., by selecting cancel button 1714. Locked Print UI Module 416 may implement the features of the job history window through many different combinations of GUI elements within the embodiments of this invention.

1. List Context

In the example of graphical user interface 1700, List context 1704 is selected, which displays the print jobs of the group of print jobs corresponding to group print job name "Job Name 3*" in list format. Therefore, each of the print jobs of the group are listed, including a display of a date 1716 and time 1718 for each print job. These print jobs are individually selectable at the series of buttons 1720, i.e., a user may select any combination of the listed print jobs and select print button 1710 to print the combination of print jobs, or delete button 1712 to delete the combination of print jobs from HDD 414. The level of detail shown for the print jobs in list context 1704 is configurable through Locked Print Configuration Module 420.

2. Date Context

Figure 18:
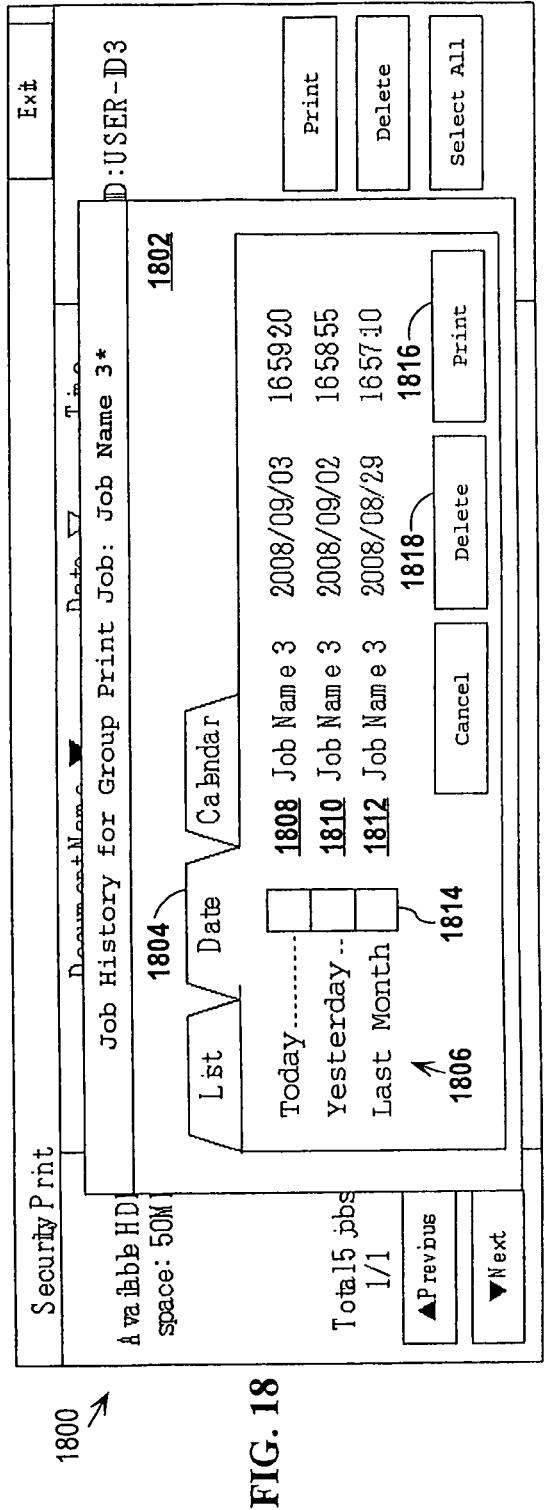

Graphical user interface 1800 of FIG. 18 depicts a job history window 1802 in which the Date context 1804 is selected. In this example, Date context 1804 displays the print jobs associated with a particular group print job name, i.e., "Job Name 3*", and includes labels 1806 for subsets of the group of print jobs. In the example of graphical user interface 1800, labels 1806 describe the time frame for the creation date of each set of the print jobs.

To illustrate, print job 1808, which was created on Sep. 3, 2008, is labeled "Today". This label is based on the assumption that job history window 1802 was created on Sep. 3, 2008. If additional print jobs of the group had been created on Sep. 3, 2008, then these additional print jobs would also be visually associated with the label "Today". Also, print job 1810, which was created on Sep. 2, 2008, is labeled "Yesterday", and print job 1812, which was created Aug. 29, 2008, is labeled "Last Month". As with the print jobs of job history window 1702, print jobs 1808-1812 of job history window 1802 are individually selectable at the series of buttons 1814, i.e., a user may select any combination of the listed print jobs and select print button 1816 to print the combination of print jobs, or delete button 1818 to delete the combination of print jobs from HDD 414. Date context 1804 is configurable through Locked Print Configuration Module 420.

3. Calendar Context

Figures 19, 20:
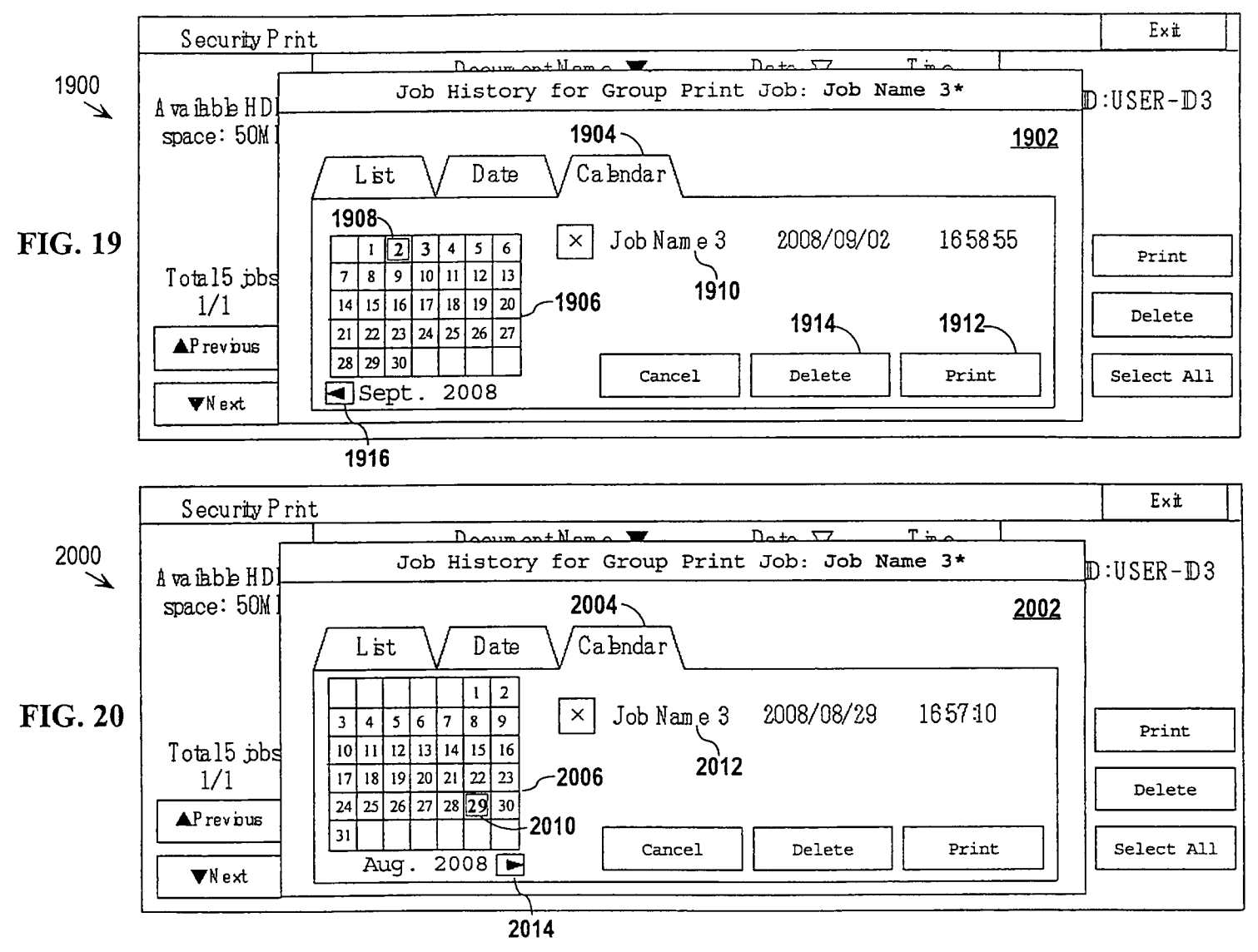

Graphical user interface 1900 of FIG. 19 depicts a job history window 1902 in which the Calendar context 1904 is selected. Calendar context 1904 includes a GUI element representing a calendar 1906 that includes selectable days of a particular month. In the example of graphical user interface 1900, calendar 1906 represents September 2008. When a user selects one of the days of calendar 1906, job history window 1902 displays the print jobs created on the selected day that are in the group of print jobs associated with a particular group print job name, i.e., "Job Name 3*". For example, a user has selected Sep. 2, 2008 on calendar 1906, as indicated by visual cue 1908, which includes, as a non-limiting example, a box drawn around the selected day. Because Sep. 2, 2008 is selected, print job 1910, which was created on Sep. 2, 2008, is displayed in job history window 1902. If other print jobs associated with the particular group print job name, i.e., "Job Name 3*", had been created on Sep. 2, 2008, then those print jobs would also be displayed in job history window 1902. From Calendar context 1904, the user has the option of performing actions on one or more of the displayed print jobs. For example, if a user selects print job 1910 and selects print button 1912, then printing device 400 processes print job 1910 for printing. Also, if the user selects print job 1910 and selects delete button 1914, then printing device 400 deletes print job 1910 from Job DB 412 and HDD 414.

In one embodiment of the invention, the days of the displayed month that have print jobs associated therewith are visually distinguished from the days of the displayed month that are not associated with print jobs. For example, Sep. 2, 2008 and Sep. 3, 2008 are bolded in calendar 1906. This indicates to a user that these days have print jobs associated therewith, and are selectable. In another embodiment of the invention, print jobs from only one selected day of the displayed month are displayed in job history window 1902.

In another aspect of the invention, calendar 1906 includes the ability to display a different month than the month that is currently being displayed. For example, calendar 1906 displays "September 2008". However, if a user selects GUI element 1916, then calendar 1906 displays "August 2008", as illustrated by graphical user interface 2000 of FIG. 20. In the example of graphical user interface 2000, visual cue 2010, by default, is visually associated with a day of the month displayed in calendar 2006 that has a print job associated therewith. As such, Aug. 29, 2008 is highlighted using visual cue 2010, and print job 2012, which has a creation date of Aug. 29, 2008, is displayed in job history window 2002. The user has the option of returning to graphical user interface 1900 displaying "September 2008" by selecting GUI element 2014.

In one embodiment of the invention, the user may view only calendar months having a print job of the selected group of print jobs associated therewith. As such, job history window 1902 only provides for scrolling to "August 2008", and job history window 2002 only provides for scrolling to "September 2008" because instances of print jobs associated with group print job name "Job Name 3*" were created only on Sep. 3, 2008, Sep. 2, 2008, and Aug. 29, 2008. The option to only allow a user to scroll to months with print jobs associated therewith is configurable through Locked Print Configuration Module 420. Furthermore, other aspects of the Calendar context are also configurable through Locked Print Configuration Module 420. For example, a job history window may optionally include a GUI element to allow a user to quickly jump to the present date, i.e., a "Today" button. Also, the type of information presented to a user in connection with print jobs in the Calendar context is configurable.

V. Comparing Versions of Locked Print Data

Figure 21:
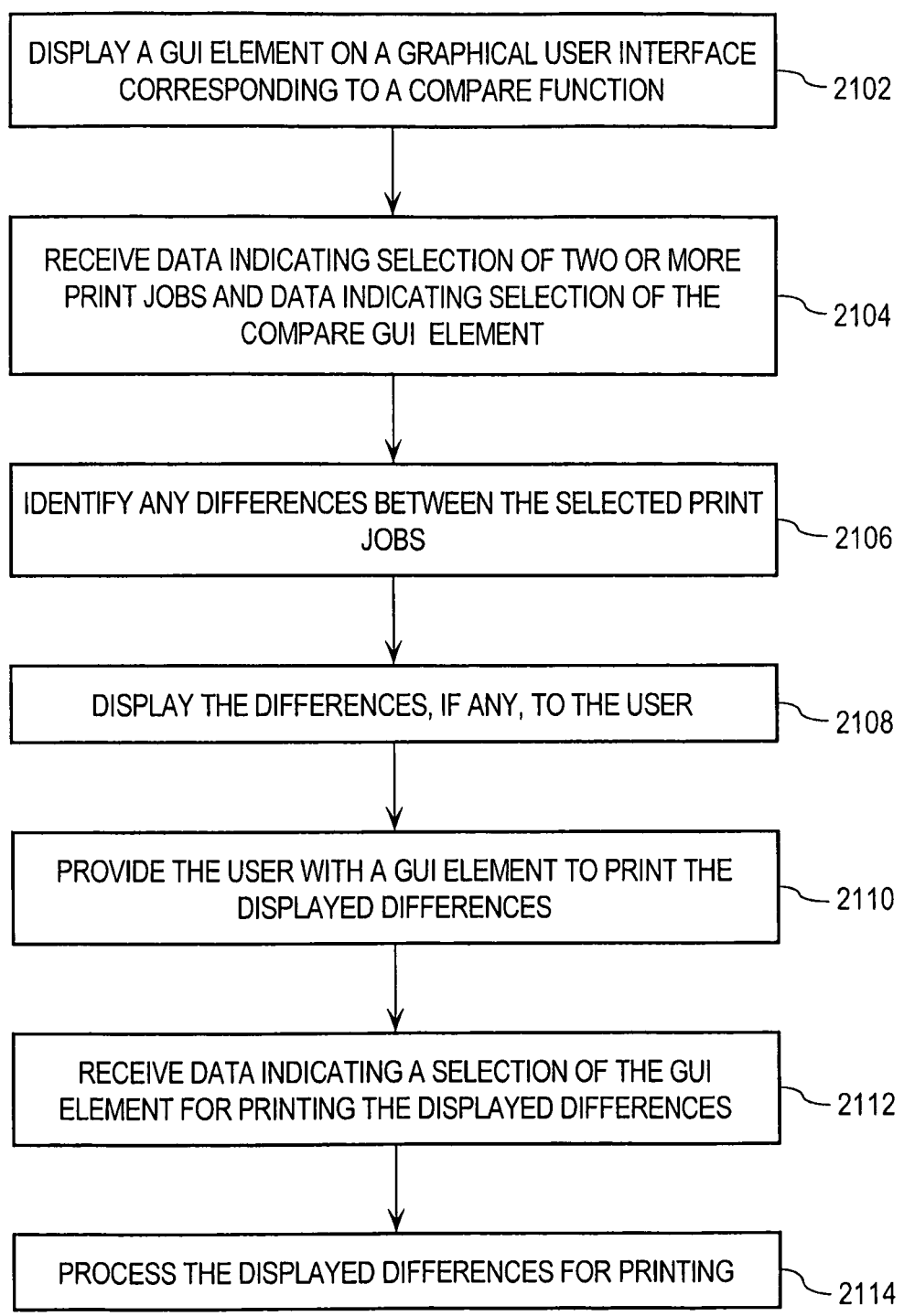
FIG. 21 is a flow diagram depicting an approach for comparing two or more print jobs and displaying the identified differences, if any.

According to one embodiment of the invention, a user may compare print data associated with two or more print jobs and view or print the differences between the two print jobs. Flow diagram 2100 of FIG. 21 illustrates an example process of comparing two or more print jobs and presenting the differences to the user.

Figure 22:
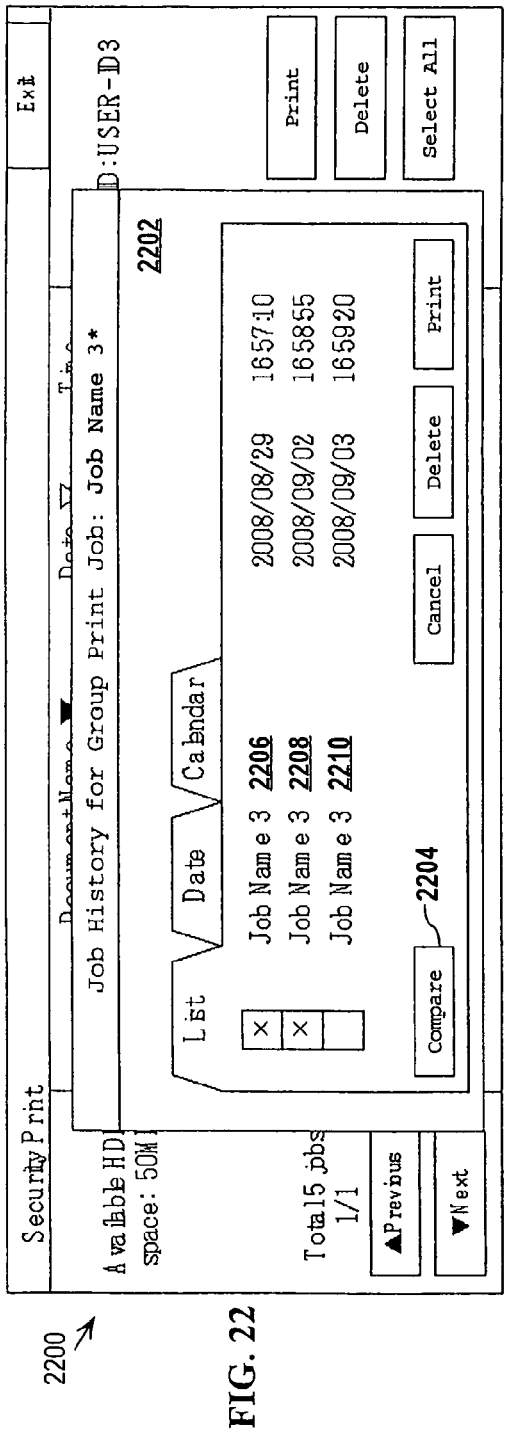
FIG. 22 depicts an example graphical user interfaces generated at a printing device to facilitate comparison of two or more print jobs.
Figure 23:
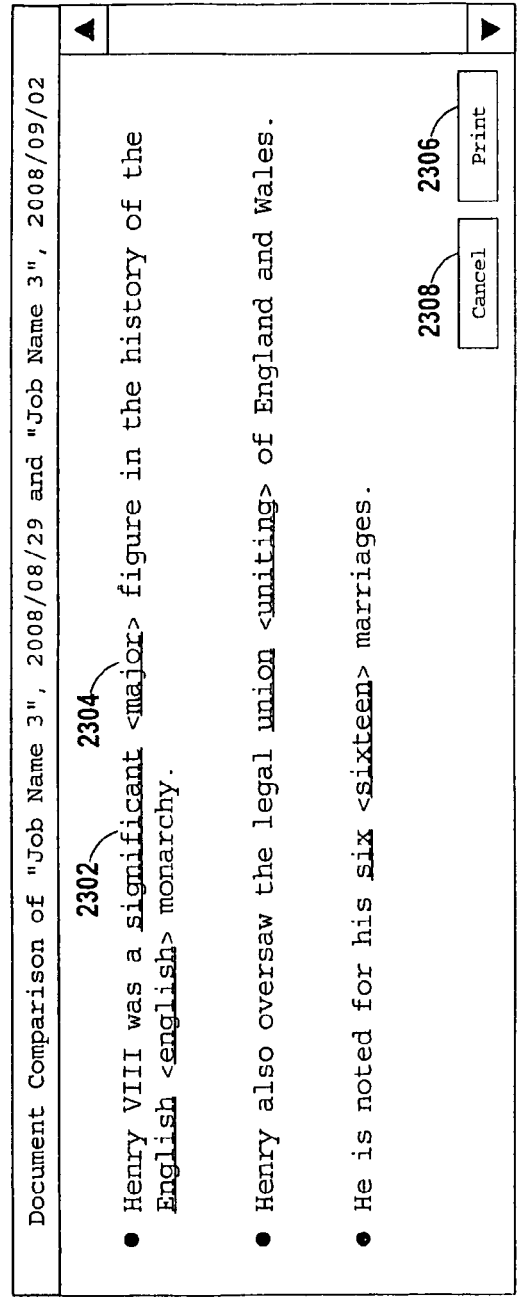
FIG. 23 depicts an example graphical user interfaces generated at a printing device that displays differences identified between two or more print jobs.

At step 2102, a GUI element corresponding to a compare function is displayed on a graphical user interface. For example, graphical user interface 2200 of FIG. 22 displays job history window 2202 including a GUI element for comparing two print jobs, i.e., Compare button 2204. At step 2104, data indicating a selection of two or more print jobs and data indicating selection of the compare GUI element are received. In one embodiment of the invention, Compare button 2204 is only selectable, or active, if two or more of the print jobs 2206-2210 are selected. In the example of graphical user interface 2200, print job 2206 and print job 2208 are selected and Compare button 2204 is selectable. However, if a user deselects print job 2208, leaving print job 2206 as the only selected print job, Compare button 2204 would no longer be selectable.

At step 2106, differences between the selected print jobs are identified, if any. In the example of graphical user interface 2200, Locked Print UI Module 416 identifies differences between print job 2206 and print job 2208. Various techniques may be used to determine differences between selected print jobs. For example, printing device 400 may be configured with a compare process for comparing print jobs. As another example, comparing print jobs may be performed external to printing device 400. In this example, Locked Print UI Module 416 may transmit two or more print jobs to a remote location for comparison and then receive and display the results of the comparison.

At step 2108, the differences between the selected print jobs are displayed to a user, if any differences were identified. For example, Locked Print UI Module 416 displays at least the differences between print job 2206 and print job 2208 to a user. The differences may be in list form, or may be presented in the context of one of the selected print jobs. Graphical user interface 2300 illustrates an example display of differences between print job 2206 and print job 2208. In graphical user interface 2300, differences between the selected print jobs are presented in the context of the surrounding text that is common to both print jobs. In the example of graphical user interface 2300, the differences between the print jobs are highlighted using visual cues. For example, word 2302 and word 2304 represent a particular difference between the documents. In this example, word 2302 is from a first selected print job and word 2304 is from a second selected print job. The visual cues associated with words from each selected print job are consistent throughout the displayed differences in order to indicate which visually cued words come from the first selected print job and which visually cued words are from the second selected print job. The manner of the display of the differences between the selected print jobs is configurable through Locked Print Configuration Module 420.

At step 2110, the user is provided with a GUI element to print the displayed differences. This feature is especially useful if the selected documents have many differences to display. For example, graphical user interface 2300 includes a GUI element, i.e., Print button 2306, to allow a user to request printing of the displayed differences. At step 2112, data indicating a selection of the GUI element for printing the displayed differences is received. For example, if a user selects Print button 2306, then Locked Print UI Module 416 receives data indicating that Print button 2306 was selected. At step 2114, the displayed differences are processed for printing. In the example of graphical user interface 2300, Locked Print UI Module 416 causes printing device 400 to process the displayed differences for printing upon receipt of the data indicating selection of Print button 2306. Graphical user interface 2300 also includes Cancel button 2308, which returns the display to graphical user interface 2200 of FIG. 22.

In the example of graphical user interface 2200, the GUI element corresponding to a compare function is located in the job history window. However, the GUI element associated with the compare function may be located on any graphical user interface displaying print jobs to a user. Furthermore, the compare function associated with a compare GUI element may be located at Locked Print UI Module 416, or at another module of printing device 400, or may be located external to printing device 400.

As a further example, Locked Print UI Module 416 may cause an application to compare two or more print jobs when a user requests a comparison. This application may reside on printing device 400, e.g., as a part of Locked Print UI Module 416 or external to Locked Print UI Module 416, or may be an application that resides on a device external to printing device 400. For example, Locked Print UI Module 416 may transmit two or more print jobs to an application that resides on a web server. In this example, the user may view the results of the comparison by causing a client device or printing device 400 to connect to the web server and display information provided by the web server, i.e., through a web browser, or client application, etc.

VI. Implementation Mechanisms

The approach described herein for implementing locked printing with a display of cost data may be implemented on any type of computing platform or architecture. According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 24:
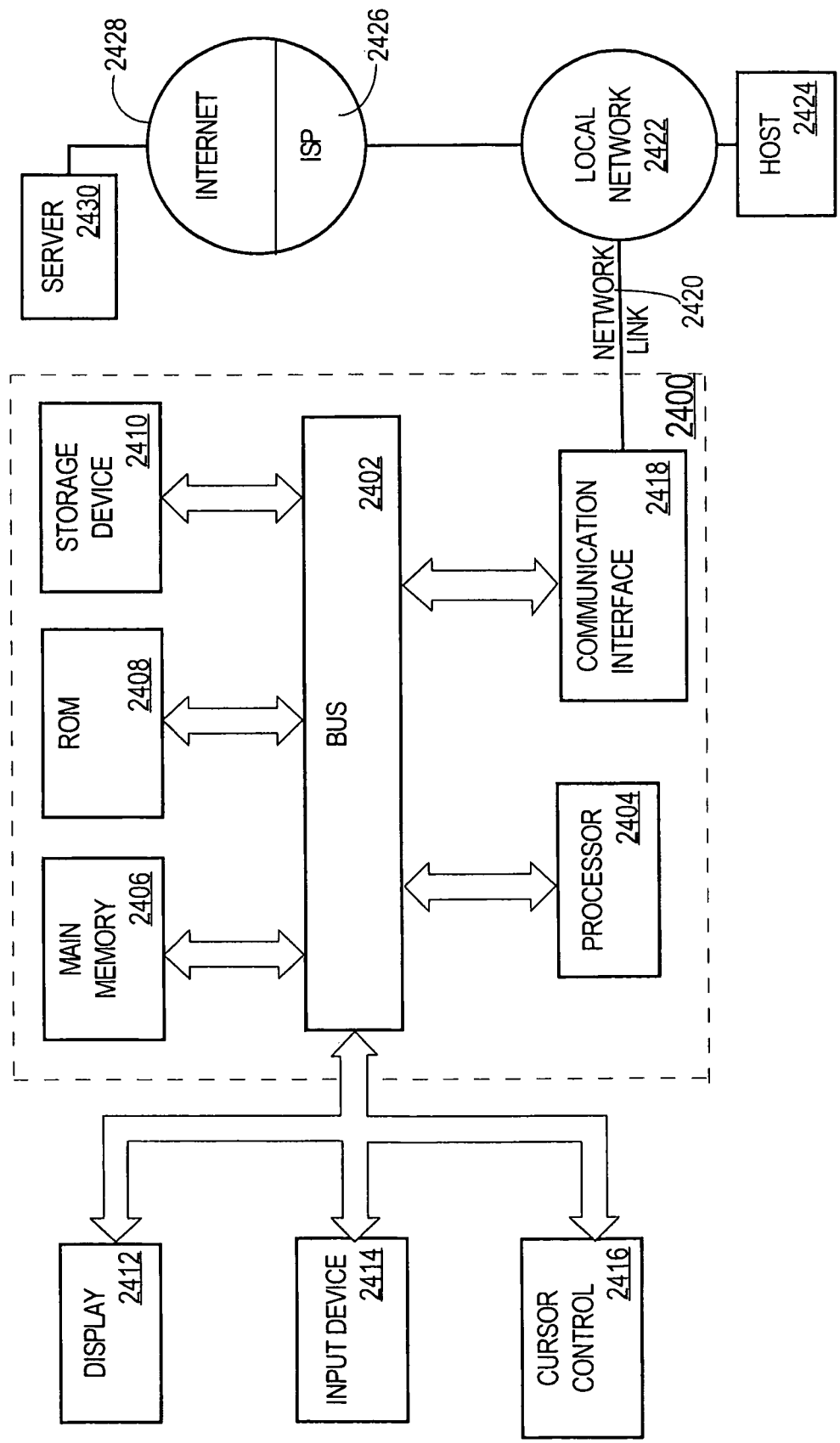
FIG. 24 is a block diagram of a computer system on which embodiments of the invention may be implemented.

FIG. 24 is a block diagram that depicts an example computer system 2400 upon which embodiments of the invention may be implemented. Computer system 2400 includes a bus 2402 or other communication mechanism for communicating information, and a processor 2404 coupled with bus 2402 for processing information. Computer system 2400 also includes a main memory 2406, such as a random access memory (RAM) or other dynamic storage device, coupled to bus 2402 for storing information and instructions to be executed by processor 2404. Main memory 2406 also may be used for storing temporary variables or other intermediate information during execution of instructions to be executed by processor 2404. Computer system 2400 further includes a read only memory (ROM) 2408 or other static storage device coupled to bus 2402 for storing static information and instructions for processor 2404. A storage device 2410, such as a magnetic disk or optical disk, is provided and coupled to bus 2402 for storing information and instructions.

Computer system 2400 may be coupled via bus 2402 to a display 2412, such as a cathode ray tube (CRT), for displaying information to a computer user. An input device 2414, including alphanumeric and other keys, is coupled to bus 2402 for communicating information and command selections to processor 2404. Another type of user input device is cursor control 2416, such as a mouse, a trackball, or cursor direction keys for communicating direction information and command selections to processor 2404 and for controlling cursor movement on display 2412. This input device typically has two degrees of freedom in two axes, a first axis (e.g., x) and a second axis (e.g., y), that allows the device to specify positions in a plane.

Computer system 2400 may implement the techniques described herein using customized hard-wired logic, one or more ASICs or FPGAs, firmware and/or program logic or computer software which, in combination with the computer system, causes or programs computer system 2400 to be a special-purpose machine. According to one embodiment of the invention, those techniques are performed by computer system 2400 in response to processor 2404 executing one or more sequences of one or more instructions contained in main memory 2406. Such instructions may be read into main memory 2406 from another computer-readable medium, such as storage device 2410. Execution of the sequences of instructions contained in main memory 2406 causes processor 2404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 2400, various computer-readable media are involved, for example, in providing instructions to processor 2404 for execution. Such a medium may take many forms, including but not limited to, non-volatile media and volatile media. Non-volatile media includes, for example, optical or magnetic disks, such as storage device 2410. Volatile media includes dynamic memory, such as main memory 2406. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 2404 for execution. For example, the instructions may initially be carried on a magnetic disk of a remote computer. The remote computer can load the instructions into its dynamic memory and send the instructions over a telephone line using a modem. A modem local to computer system 2400 can receive the data on the telephone line and use an infra-red transmitter to convert the data to an infra-red signal. An infra-red detector can receive the data carried in the infra-red signal and appropriate circuitry can place the data on bus 2402. Bus 2402 carries the data to main memory 2406, from which processor 2404 retrieves and executes the instructions. The instructions received by main memory 2406 may optionally be stored on storage device 2410 either before or after execution by processor 2404.

Computer system 2400 also includes a communication interface 2418 coupled to bus 2402. Communication interface 2418 provides a two-way data communication coupling to a network link 2420 that is connected to a local network 2422. For example, communication interface 2418 may be an integrated services digital network (ISDN) card or a modem to provide a data communication connection to a corresponding type of telephone line. As another example, communication interface 2418 may be a local area network (LAN) card to provide a data communication connection to a compatible LAN. Wireless links may also be implemented. In any such implementation, communication interface 2418 sends and receives electrical, electromagnetic or optical signals that carry digital data streams representing various types of information.

Network link 2420 typically provides data communication through one or more networks to other data devices. For example, network link 2420 may provide a connection through local network 2422 to a host computer 2424 or to data equipment operated by an Internet Service Provider (ISP) 2426. ISP 2426 in turn provides data communication services through the world wide packet data communication network now commonly referred to as the "Internet" 2428. Local network 2422 and Internet 2428 both use electrical, electromagnetic or optical signals that carry digital data streams.

Computer system 2400 can send messages and receive data, including program code, through the network(s), network link 2420 and communication interface 2418. In the Internet example, a server 2430 might transmit a requested code for an application program through Internet 2428, ISP 2426, local network 2422 and communication interface 2418. The received code may be executed by processor 2404 as it is received, and/or stored in storage device 2410, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
   a user interface configured to display information to a user and receive user input from the user; and
   a locked print process configured to:
   receive a plurality of print jobs that are to be processed as locked print data, wherein a first print job of the plurality of print jobs is associated with a first print job name and is associated with a first time stamp, and a second print job of the plurality of print jobs is associated with a second print job name and is associated with a second time stamp,
   cause the plurality of print jobs to be stored at the printing device and not immediately processed for printing,
   determine whether the first print job name is the same as the second print job name,
   determine whether the first time stamp is later than the second time stamp,
   in response to determining that the first print job name is the same as the second print job name, cause to be displayed, on the user interface, a third print job name, representing the first print job and the second print job, instead of causing to be displayed the first print job name and the second print job name,
   in response to determining that the first time stamp is later than the second time stamp, cause to be displayed, on the user interface, the first time stamp in visual association with the third print job name,
   receive data indicating a request to process print data associated with the third print job name for printing, and
   in response to receiving the data indicating the request to process print data associated with the third print job name for printing, cause the first print job to be processed for printing.

2. The printing device of claim 1, wherein the third print job name is the same as the first print job name.

3. The printing device of claim 1, wherein the locked print process is further configured to:
   receive data indicating a request to delete, from the printing device, print data associated with the third print job name; and
   in response to receiving the data indicating the request to delete, from the printing device, print data associated with the third print job name, cause the first print job and the second print job to be deleted from the printing device.

4. The printing device of claim 1,
wherein the user interface includes a visual element, visually associated with the third print job name and selectable by the user, representing an option to display information on the first print job and the second print job; and
wherein the locked print process is further configured to:
in response to detecting selection of the visual element representing the option to display information on the first print job and the second print job, cause to be displayed, on the user interface, information on the first print job and the second print job, and
wherein the information on the first print job and the second print job comprises the first print job name, the second print job name, the first time stamp, and the second time stamp.

5. The printing device of claim 4, wherein the locked print process is further configured to:
in response to detecting selection of the visual element representing the option to display information on the first print job and the second print job, cause to be displayed, on the user interface, a second visual element, visually associated with the information on the first print job and the second print job, representing the option to hide information on the first print job and the second print job;
in response to detecting selection of the second visual element, cause the information on the first print job and the second print job to be hidden.

6. The printing device of claim 4,
wherein the information on the first print job and the second print job is displayed, on the user interface, in a visually independent graphical user interface element; and
wherein the visually independent graphical user interface element includes:
(a) a second visual element representing an option to process for printing one or more of the first print job and the second print job,
(b) a third visual element representing an option to cause one or more of the first print job and the second print job to be deleted from the printing device, and
(c) a set of one or more visual elements, wherein selection of a first visual element of the set of one or more visual elements selects the first print job and selection of a second visual element of the set of one or more visual elements selects the second print job.

7. The printing device of claim 1,
wherein the user interface includes a visual element representing an option to compare two or more print jobs of the plurality of print jobs; and
wherein the locked print process is further configured to:
in response to detecting selection of the visual element representing the option to compare two or more print jobs, cause to be displayed, on the user interface, one or more differences between print data for the two or more print jobs.

8. The printing device of claim 1,
wherein the user interface includes a visual element representing an option to print a comparison of two or more print jobs of the plurality of print jobs; and
wherein the locked print process is further configured to:
in response to detecting selection of the visual element representing the option to print the comparison of two or more print jobs, cause one or more differences between print data for the two or more print jobs to be processed for printing.

9. The printing device of claim 1,
wherein each print job of the plurality of print jobs is associated with a respective name; and
wherein the locked print process is further configured to:
determine, from the plurality of print jobs, a number of print jobs having the same name as the first print job,
determine whether the number of print jobs having the same name as the first print job exceeds a threshold, and
perform the step of cause to be displayed, on the user interface, the third print job name in response to determining that the number of print jobs having the same name as the first print job exceeds the threshold.

10. A computer-implemented method for grouping versions of a print job at a printing device, the computer-implemented method comprising:
receiving a plurality of print jobs that are to be processed as locked print data, wherein a first print job of the plurality of print jobs is associated with a first print job name and is associated with a first time stamp, and a second print job of the plurality of print jobs is associated with a second print job name and is associated with a second time stamp;
causing the plurality of print jobs to be stored at the printing device and not immediately processed for printing;
determining whether the first print job name is the same as the second print job name;
determining whether the first time stamp is later than the second time stamp;
in response to determining that the first print job name is the same as the second print job name, causing to be displayed, on a user interface at the printing device, a third print job name, representing the first print job and the second print job, instead of causing to be displayed the first print job name and the second print job name;
in response to determining that the first time stamp is later than the second time stamp, causing to be displayed, on the user interface, the first time stamp in visual association with the third print job name;
receiving data indicating a request to process print data associated with the third print job name for printing; and
in response to receiving the data indicating the request to process print data associated with the third print job name for printing, causing the first print job to be processed for printing.

11. The computer-implemented method of claim 10, wherein:
the user interface includes a visual element representing an option to compare two or more print jobs of the plurality of print jobs; and
the computer-implemented method further comprises in response to detecting selection of the visual element representing the option to compare two or more print jobs, causing to be displayed, on the user interface, one or more differences between print data for the two or more print jobs.

12. The computer-implemented method of claim 10, wherein:
the user interface includes a visual element representing an option to print a comparison of two or more print jobs of the plurality of print jobs; and
the computer-implemented method further comprises in response to detecting selection of the visual element representing the option to print the comparison of two or more print jobs, causing one or more differences between print data for the two or more print jobs to be processed for printing.

13. A non-transitory computer-readable medium storing instructions which, when processed by one or more processors, cause:
    a locked print process executing on a printing device to perform:
    receiving a plurality of print jobs that are to be processed as locked print data, wherein a first print job of the plurality of print jobs is associated with a first print job name and is associated with a first time stamp, and a second print job of the plurality of print jobs is associated with a second print job name and is associated with a second time stamp;
    causing the plurality of print jobs to be stored at the printing device and not immediately processed for printing;
    determining whether the first print job name is the same as the second print job name;
    determining whether the first time stamp is later than the second time stamp;
    in response to determining that the first print job name is the same as the second print job name, causing to be displayed, on a user interface at the printing device, a third print job name, representing the first print job and the second print job, instead of causing to be displayed the first print job name and the second print job name;
    in response to determining that the first time stamp is later than the second time stamp, causing to be displayed, on the user interface, the first time stamp in visual association with the third print job name;
    receiving data indicating a request to process print data associated with the third print job name for printing; and
    in response to receiving the data indicating the request to process print data associated with the third print job name for printing, causing the first print job to be processed for printing.

14. The non-transitory computer-readable medium of claim 13, wherein the instructions further comprise instructions which, when processed by the one or more processors, cause the locked print process to:
    receive data indicating a request to delete, from the printing device, print data associated with the third print job name; and
    in response to receiving the data indicating the request to delete, from the printing device, print data associated with the third print job name, cause the first print job and the second print job to be deleted from the printing device.

15. The non-transitory computer-readable medium of claim 13,
    wherein the user interface includes a visual element, visually associated with the third print job name and selectable by the user, representing an option to display information on the first print job and the second print job; and
    wherein the instructions further comprise instructions which, when processed by the one or more processors, cause the locked print process to:
    in response to detecting selection of the visual element representing the option to display information on the first print job and the second print job, cause to be displayed, on the user interface, information on the first print job and the second print job, and
    wherein the information on the first print job and the second print job comprises the first print job name, the second print job name, the first time stamp, and the second time stamp.

16. The non-transitory computer-readable medium of claim 15, wherein the instructions further comprise instructions which, when processed by the one or more processors, cause the locked print process to:
    in response to detecting selection of the visual element representing the option to display information on the first print job and the second print job, cause to be displayed, on the user interface, a second visual element, visually associated with the information on the first print job and the second print job, representing the option to hide information on the first print job and the second print job;
    in response to detecting selection of the second visual element, cause the information on the first print job and the second print job to be hidden.

17. The non-transitory computer-readable medium of claim 15,
    wherein the information on the first print job and the second print job is displayed, on the user interface, in a visually independent graphical user interface element; and
    wherein the visually independent graphical user interface element includes:
    (a) a second visual element representing an option to process for printing one or more of the first print job and the second print job,
    (b) a third visual element representing an option to cause one or more of the first print job and the second print job to be deleted from the printing device, and
    (c) a set of one or more visual elements, wherein selection of a first visual element of the set of one or more visual elements selects the first print job and selection of a second visual element of the set of one or more visual elements selects the second print job.

18. The non-transitory computer-readable medium of claim 13,
    wherein the user interface includes a visual element representing an option to compare two or more print jobs of the plurality of print jobs; and
    wherein the instructions further comprise instructions which, when processed by the one or more processors, cause the locked print process to:
    in response to detecting selection of the visual element representing the option to compare two or more print jobs, cause to be displayed, on the user interface, one or more differences between print data for the two or more print jobs.

19. The non-transitory computer-readable medium of claim 13,
    wherein the user interface includes a visual element representing an option to print a comparison of two or more print jobs of the plurality of print jobs; and
    wherein the instructions further comprise instructions which, when processed by the one or more processors, cause the locked print process to:
    in response to detecting selection of the visual element representing the option to print the comparison of two or more print jobs, cause one or more differences between print data for the two or more print jobs to be processed for printing.

20. The non-transitory computer-readable medium of claim 13,
    wherein each print job of the plurality of print jobs is associated with a respective name; and
    wherein the instructions further comprise instructions which, when processed by the one or more processors, cause the locked print process to:
    determine, from the plurality of print jobs, a number of print jobs having the same name as the first print job, determine whether the number of print jobs having the same name as the first print job exceeds a threshold, and perform the step of cause to be displayed, on the user interface, the third print job name in response to determining that the number of print jobs having the same name as the first print job exceeds the threshold.

* * * * *

UNITED STATES PATENT AND TRADEMARK OFFICE
CERTIFICATE OF CORRECTION

PATENT NO. : 8,456,662 B2
APPLICATION NO. : 12/423933
DATED : June 4, 2013
INVENTOR(S) : Seiichi Katano It is certified that error appears in the above-identified patent and that said Letters Patent is hereby corrected as shown below:

Title page:

1. Item (56) "References Cited", insert --2002/0120855 A1   8/2002   Wiley et al.--

2. Item (56) "References Cited", insert --JP 2001125982 A   5/2001--

3. Item (56) "References Cited", insert --JP 2001217948 A   8/2001--

4. Item (56) "References Cited", insert --JP 2002007095 A   1/2002--

5. Item (56) "References Cited", insert --EP 1621994 A1   2/2006--

Signed and Sealed this
Twenty-third Day of July, 2013

Teresa Stanek Rea
*Acting Director of the United States Patent and Trademark Office*